(12) United States Patent
Marcus et al.

(10) Patent No.: US 8,233,035 B2
(45) Date of Patent: Jul. 31, 2012

(54) DUAL-VIEW STEREOSCOPIC DISPLAY USING LINEAR MODULATOR ARRAYS

(75) Inventors: Michael A. Marcus, Honeoye Falls, NY (US); John A. Agostinelli, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 798 days.

(21) Appl. No.: 12/351,190

(22) Filed: Jan. 9, 2009

(65) Prior Publication Data

US 2010/0177171 A1    Jul. 15, 2010

(51) Int. Cl.
 *H04N 13/04* (2006.01)
(52) U.S. Cl. .................. 348/53; 348/55; 348/56; 348/57
(58) Field of Classification Search ............... 348/53–60, 348/51
See application file for complete search history.

(56) References Cited

U.S. PATENT DOCUMENTS

| | | | |
|---|---|---|---|
| 5,594,843 A | 1/1997 | O'Neill | |
| 5,781,229 A | 7/1998 | Zediker et al. | |
| 6,175,431 B1 | 1/2001 | Waldern et al. | |
| 6,215,579 B1 | 4/2001 | Bloom et al. | |
| 6,307,663 B1 | 10/2001 | Kowarz | |
| 6,411,425 B1 | 6/2002 | Kowarz et al. | |
| 6,456,432 B1 | 9/2002 | Lazzaro et al. | |
| 6,535,241 B1 | 3/2003 | McDowall et al. | |
| 6,663,788 B2 | 12/2003 | Kowarz et al. | |
| 6,678,085 B2 | 1/2004 | Kowarz et al. | |
| 6,698,890 B1 | 3/2004 | Jorke | |
| 6,802,613 B2 | 10/2004 | Agostinelli et al. | |
| 6,867,775 B2 | 3/2005 | Buck et al. | |
| 7,001,021 B2 | 2/2006 | Jorke | |
| 7,114,809 B2 | 10/2006 | Palovuori | |
| 7,180,554 B2 | 2/2007 | Divelbiss et al. | |
| 7,204,592 B2 | 4/2007 | O'Donnell et al. | |
| 7,274,500 B2 | 9/2007 | Kowarz | |
| 8,094,927 B2 * | 1/2012 | Jin et al. ......................... | 382/154 |
| 2004/0017546 A1 | 1/2004 | Agostinelli et al. | |
| 2004/0056948 A1 | 3/2004 | Gibson | |
| 2006/0077545 A1 | 4/2006 | Cobb et al. | |
| 2007/0047061 A1 | 3/2007 | Kowarz | |
| 2008/0036854 A1 * | 2/2008 | Elliott et al. ..................... | 348/55 |
| 2009/0168164 A1 * | 7/2009 | Kean et al. ..................... | 359/463 |
| 2009/0251531 A1 * | 10/2009 | Marshall et al. ................ | 348/42 |
| 2010/0066816 A1 * | 3/2010 | Kane et al. ...................... | 348/51 |
| 2011/0254934 A1 * | 10/2011 | Yoon et al. ...................... | 348/56 |

\* cited by examiner

*Primary Examiner* — Haresh N Patel
(74) *Attorney, Agent, or Firm* — Nelson Adrian Blish

(57) ABSTRACT

A method for displaying first and second stereoscopic images to first and second viewers provides the first viewer with a first decoding device having a first viewer differentiating element for receiving the first stereoscopic image and further having a first left- and right-eye differentiating elements for separating left- and right-eye images. The second viewer is provided with a second decoding device having a second viewer differentiating element for receiving the second stereoscopic image and further having a second left- and right-eye differentiating element. The first stereoscopic image is displayed to the first viewer by forming a first left-eye image and forming a first right-eye image, each over substantially half of the refresh period. The second stereoscopic image is displayed to the second viewer by forming a second left-eye image and forming a second right-eye image, each over substantially half of the refresh period.

5 Claims, 17 Drawing Sheets

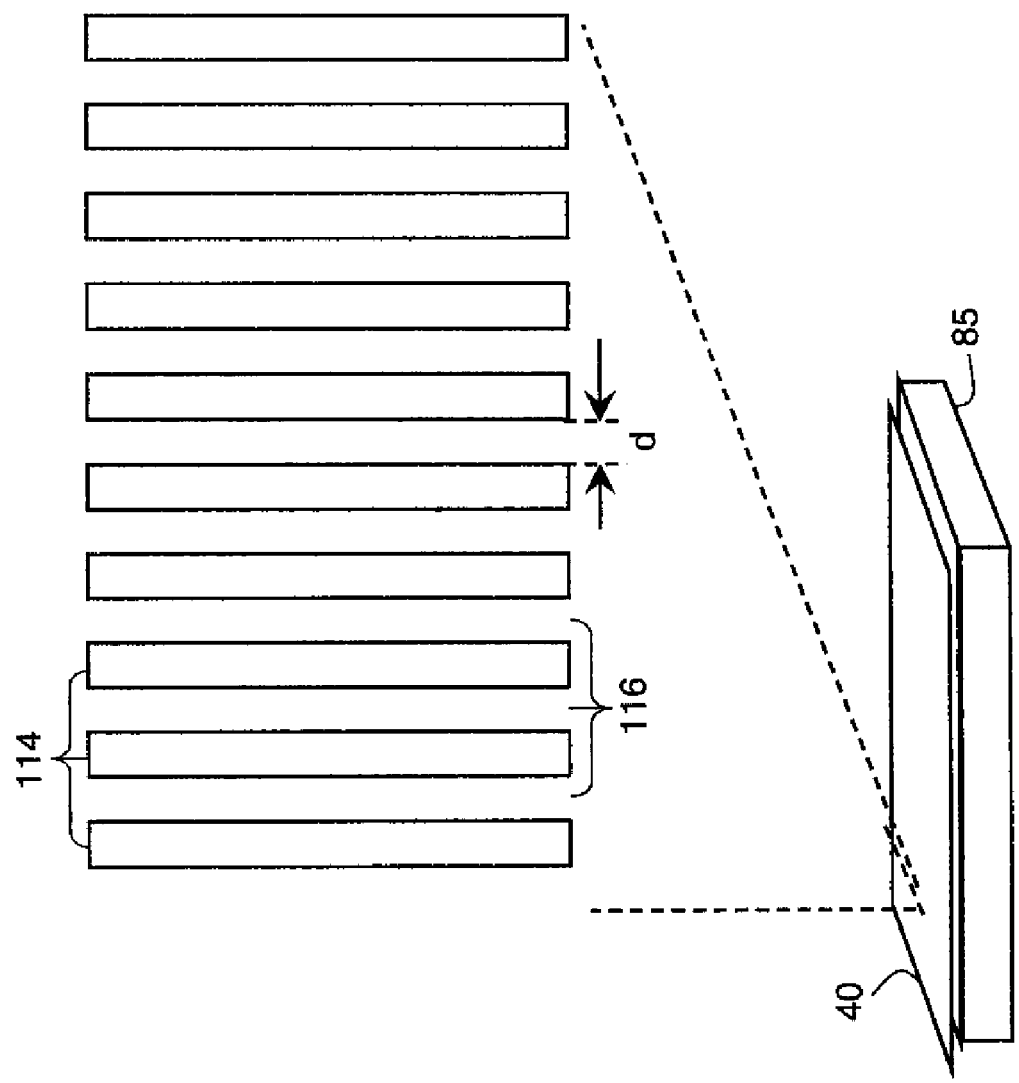

FIG. 13

DUAL-VIEW STEREOSCOPIC DISPLAY USING LINEAR MODULATOR ARRAYS

CROSS REFERENCE TO RELATED APPLICATIONS

Reference is made to commonly-assigned U.S. patent application Ser. No. 11/950,488 (now U.S. Pat. No. 7,909,474), filed Dec. 5, 2007, entitled DISPLAY APPARATUS USING BILINEAR ELECTROMECHANICAL MODULATOR, by Agostinelli et al.; U.S. patent application Ser. No. 12/047,605 (now U.S. Publication No. 2009/0231697), filed Mar. 13, 2008, entitled STEREOSCOPIC DISPLAY USING MULTILINEAR ELECTROMECHANICAL MODULATOR, by Marcus et al., and U.S. patent application Ser. No. 12/116,467 (now U.S. Pat. No. 8,134,591), filed May 7, 2008, entitled DISPLAY USING BIDIRECTIONALLY SCANNED LINEAR MODULATOR by Marcus et al.; the disclosures of which are incorporated herein.

FIELD OF THE INVENTION

This invention generally relates to display apparatus and more particularly relates to a display apparatus for dual-view stereoscopic presentation using an arrangement of linear electromechanical grating devices.

BACKGROUND OF THE INVENTION

With continuing improvements in cost and performance, solid-state lasers have potential benefits as illumination components for display systems. Their inherent spectral purity, high brightness, and long operating life have sparked particular interest among designers of high-end color projection systems for digital cinema, simulation, and other high-performance imaging apparatus. However, proposed solutions for using laser light sources for digital projection fall short of what is needed for providing robust display apparatus that take advantage of this potential.

Stereoscopic projection has been one area of particular interest for cinema projection overall. Conventional configurations for stereo projection include configurations that use two projectors, one for the left eye and the other for the right eye. This basic model has been applied with earlier film-based systems as well as with digital projection equipment, from vendors such as Barco Corporation. Although such two-projector designs have successfully shown the feasibility and enhanced imaging capabilities afforded by stereoscopic imaging systems, these systems are expensive, require precision alignment to each other, and impose some additional requirements on theater design and layout that complicate retrofit installation.

Various types of solutions for stereoscopic projection have been presented for digital projector apparatus, including configurations that use only a single projector. These have typically included systems utilizing either of two types of spatial light modulators (SLMs). The first type of spatial light modulator used in proposed stereoscopic designs is the digital light processor (DLP), a digital micromirror device (DMD), developed by Texas Instruments, Inc., Dallas, Tex. The second type of SLM widely used for digital projection is based on liquid crystal technology, available both as a transmissive light modulator, the liquid crystal device (LCD), and as a reflective liquid crystal on silicon (LCOS) modulator.

Another type of light modulator solution for digital projection uses a linear light modulator that uses a one-dimensional array of n micro-devices and forms a two-dimensional image by forming m successive single-line images, each single-line image extending in a first direction, and then scanning these m successive line images in a direction orthogonal to the first direction in order to project an image of m×n pixels.

Among linear light modulators are grating light valve (GLV) designs, offered by silicon light machines as described in U.S. Pat. No. 6,215,579 (Bloom et al.) and others. Still other solutions have been proposed using grating electromechanical systems (GEMS) devices, such as those disclosed in commonly-assigned U.S. Pat. No. 6,802,613 (Agostinelli et al.).

With any type of stereoscopic projection system, some type of separation mechanism is needed in order to distinguish the left and right images that are combined on a common display screen, but are intended for the appropriate left and right eyes of the viewers. Left- and right-eye images can be separated in time, can be of different polarizations relatively orthogonal to each other, or can be of different wavelengths. Conventional two-projector systems can use any of these separation schemes as just described. Single-projector digital systems can also use any of these methods. However, because they must direct light from the same projection lens, single-projector systems inherently tend to be less efficient.

Time-sequencing systems use a "page flipping" technique. Page-flipping alternately displays left- and right-eye images to provide stereo images to one or more viewers wearing shutter glasses that are synchronized to the display refresh rates. One example of this type of display system adapted for presenting stereoscopic images to multiple viewers is given in U.S. Pat. No. 6,535,241 (McDowall et al.).

Stereoscopic systems using polarization differences provide the left- and right-eye images using light at respectively orthogonal polarizations. Viewers are provided with polarized glasses to separate these left- and right-eye images. One example of this type of display system using linearly polarized light is given in U.S. Pat. No. 7,204,592 (O'Donnell et al.). A stereoscopic display apparatus using left- and right-circular polarization is described in U.S. Pat. No. 7,180,554 (Divelbiss et al.).

Stereoscopic systems can separate left- and right-eye images by wavelength and provide viewers with filter glasses that are suitably designed to distinguish the appropriate image for each eye. One example of this type of spectral separation display system is given in U.S. Pat. No. 7,001,021 (Jorke).

One approach for stereoscopic imaging, outlined in U.S. Pat. No. 6,867,775 (Buck et al.) describes displaying an object for a plurality of viewers located in different positions, and generating separate stereoscopic images based on the position and image of the object representing the perspective view of the particular viewer. To generate the image that corresponds to each viewer, a plurality of spectral regions is filtered out of a radiation spectrum of an image display device. In order to produce different images that describe different position perspectives, different radiation or emission spectra of the image display device are decoupled as relatively narrow frequency bands, representing the three color receptors, for example. In order to separate the half images corresponding to each of the viewer's eyes, different adjacent spectral regions are preferably decoupled from the emission or radiation spectrum of the image display device. For a viewer A, for example, 445 to 455 nm, 515 to 525 nm, and 605 to 615 nm frequency bands, respectively, are decoupled for the left eye, and 460 to 470 nm, 530 to 540 nm, and 622 630 nm frequency bands, respectively, are decoupled for the right eye. For a viewer B, the frequency bands are shifted in comparable fashion and decoupled around the spectral lines at 480, 550, and 635 nm, respectively. In this way, two viewers A and B see different 3-D perspectives by using view glasses or other separators with different sets of filters. While this approach may provide different stereoscopic views of an object for individual viewers, however, it requires filter glasses that are highly selective and costly. Moreover, perfect spectral separation is not possible, so that there can be some crosstalk between viewers.

Recently, imaging apparatus have been adapted for use as dual-view systems, using technology and approaches similar to those applied to the task of stereoscopic imaging. Of considerable interest for gaming and simulation applications, dual-viewer operation is a variant of stereoscopic operation, provided using stereoscopic projection apparatus and techniques, with only a slight change at the viewer end. For dual-viewer mode, the change is straightforward: what had been termed the "left-eye image" for stereoscopic viewing is now presented to a first viewer and what had been termed the "right-eye image" is now presented to a second viewer. Similar techniques are used for separating the images presented to each viewer, using timing, polarization state, or wavelength.

Although the value of providing dual-view stereo viewing capability is recognized, conventional approaches for achieving this have proved less than satisfactory. For example, image crosstalk would be highly unfavorable for dual-view imaging. Approaches such as that outlined in the Buck et al. '775 disclosure do not have the capability to support dual-view stereoscopic imaging in which two viewers are presented with different image content and the image presentation for each viewer is stereoscopic. Other approaches struggle to provide sufficient brightness even with dual-view or stereoscopic imaging. For example, video multiplexing approaches, such at that shown in the McDowall et al. '241 disclosure, provide only ¼ the available light to each eye of the viewer during a single display cycle. Extending these approaches to the requirements of dual view stereoscopic imaging would not provide a satisfactory viewing experience.

Thus, it can be seen that there is a need for apparatus and methods for providing dual-view stereoscopic image display using linear modulator arrays.

SUMMARY OF THE INVENTION

It is an object of the present invention to address the need for improved dual-view stereoscopic projection apparatus. With this object in mind, the present invention provides a method for displaying a first stereoscopic image to a first viewer and a different second stereoscopic image to a second viewer in a repeated sequence having a refresh period, the repeated sequence comprising:

a) providing the first viewer with a first decoding device having a first viewer differentiating element for receiving the first stereoscopic image and blocking the second stereoscopic image and further comprising a first left-eye differentiating element and a first right-eye differentiating element for separating left- and right-eye stereoscopic images of the first stereoscopic image, respectively;

b) providing the second viewer with a second decoding device having a second viewer differentiating element for receiving the second stereoscopic image and blocking the first stereoscopic image and further comprising a second left-eye differentiating element and a second right-eye differentiating element for separating left- and right-eye stereoscopic images of the second stereoscopic image, respectively;

c) displaying the first stereoscopic image to the first viewer by:
   (i) forming a first left-eye stereoscopic image over substantially half of the refresh period;
   (ii) forming a first right-eye stereoscopic image over substantially half of the refresh period; and d) displaying the second stereoscopic image to the second viewer by:
   (i) forming a second left-eye stereoscopic image over substantially half of the refresh period; and
   (ii) forming a second right-eye stereoscopic image over substantially half of the refresh period.

It is a feature of the present invention that it provides methods for dual-view stereoscopic projection using linear spatial light modulators for improved brightness, resolution, and light utilization.

It is an advantage of the present invention that it provides dual-view stereoscopic imaging from a single projection display apparatus.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 6A is a plan view showing a portion of a striped polarizer in one display apparatus embodiment;

FIG. 13 shows a table describing the timing for various embodiments of this invention.

DETAILED DESCRIPTION OF THE INVENTION

Figure 1:
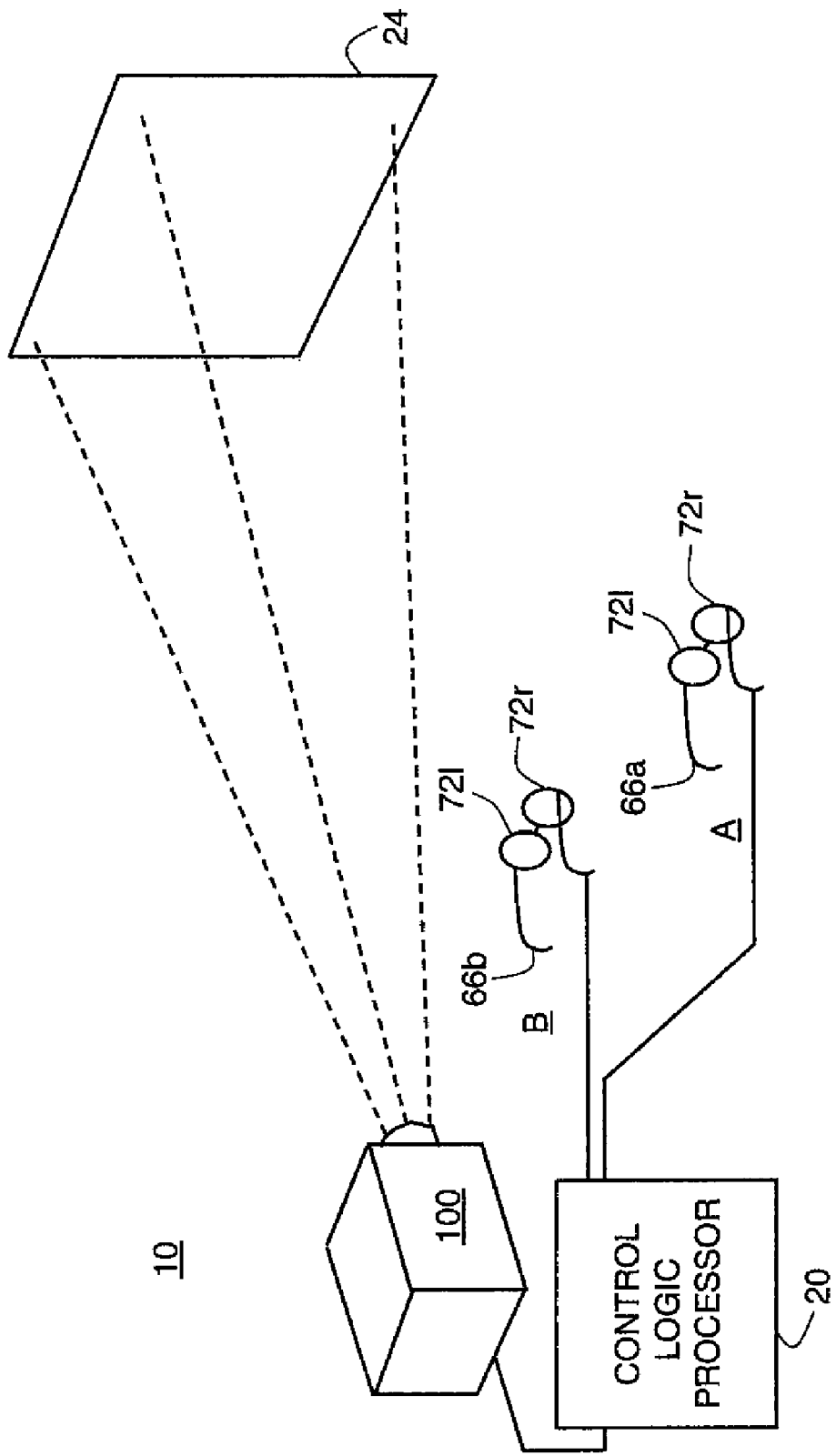
FIG. 1 shows a projection apparatus used for stereoscopic or dual-view operation.

The present description is directed in particular to elements forming part of, or cooperating more directly with, apparatus in accordance with the invention. It is to be understood that elements not specifically shown or described may take various forms well known to those skilled in the art. Figures shown and described herein are provided in order to illustrate key principles of operation of the present invention and are not drawn with intent to show actual size or scale. Some exaggeration may be necessary in order to emphasize relative spatial relationships or principles of operation.

In the following disclosure, the phrase "left-eye image" denotes the image formed by a display apparatus and intended for viewing by the left eye of the viewer. Likewise, the phrase "right-eye image" refers to the image that is intended for viewing from the right eye of the viewer.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S. Two subsets are disjoint if their intersection is the empty set, that is, if they have no elements in common. Two subsets A and B are unequal if both B is not a subset of A and A is not a subset of B. In such a case, one or more members of each subset is not a member of their intersection.

In the context of the present invention, the term "spectral range" refers to a single wavelength or to a relatively narrow range of wavelengths of no more than about 40 nm. As described earlier in the background section, spectral stereo vision separation schemes project left- and right-eye images at different wavelengths for each primary color (red, green, or blue, conventionally referred to as R, G, or B) and use filter elements to separate the left- and right-eye image content for each color.

As noted in the background material given earlier, conventional approaches for either stereoscopic or dual-view imaging use one of three differentiating characteristics or distinguishing features for separating left-eye and right-eye images:

(i) timing, alternating between left- and right-eye visibility using shutter glasses or similar decoding device;
(ii) polarization state, providing the left-eye image having a first polarization state and the right-eye image having a second polarization state that is orthogonal to the first, with polarized glasses as the decoding device; and
(iii) spectral bands, providing the left-eye image with light that is within a first well-defined set of wavelengths and providing the right-eye image with light that is within a second well-defined set of wavelengths, minimizing crosstalk between left- and right-eye channels using filter glasses as the decoding device.

Embodiments of the present invention provide ways to combine two or more of these differentiating characteristics in order to provide both dual-view and stereoscopic imaging at the same time. In the most general case, a first viewer has a first decoding device having a first viewer differentiating element selected from the classes of timing, polarization state or spectral bands for transmitting a first stereoscopic image and blocking a second stereoscopic image, and the second viewer has a second decoding device having a second viewer differentiating element of the same class as the first viewer for transmitting the second stereoscopic image and blocking the first stereoscopic image. The first decoding device also includes a first left-eye differentiating element and a first right-eye differentiating element for separating left and right eye stereoscopic images of the first stereoscopic image respectively selected from the remaining classes of timing, polarization state, or spectral bands not being used for the first viewer differentiating element. The second decoding device also includes a second left-eye differentiating element and a second right-eye differentiating element for separating left and right eye stereoscopic images of the second stereoscopic image respectively selected from the remaining classes of timing, polarization state or spectral bands not being used for the second viewer differentiating element.

For image separation, embodiments of the present invention may use orthogonally polarized light as the differentiating characteristic or distinguishing feature between left- and right-eye images. Polarization can be linear, elliptical, or circular, with the modulated light for the left eye orthogonally polarized with respect to the modulated light for the right eye.

Embodiments of the present invention use a spatial light modulator (SLM) that is capable of high-speed operation compatible with the refresh rates needed with each timing arrangement. Area spatial light modulators that can be used for various embodiments of the present invention include the digital light processor (DLP) a digital micromirror device (DMD), developed by Texas Instruments, Inc., Dallas, Tex. Another type of SLM widely used for digital projection is based on liquid crystal technology, available both as a transmissive light modulator, the liquid crystal device (LCD), and as a reflective liquid crystal on silicon (LCOS) modulator.

Embodiments of the present invention may alternately use linear light modulator arrays such as multilinear grating electro-mechanical systems (GEMS) devices to provide dual-view stereoscopic display apparatus that allow advantages such as improved use of laser light sources and increased brightness, from a single projector and using less complex optical designs than had been previously proposed. In the context of the present disclosure, the term "chip" is used as it is familiarly used by those skilled in the micro-electromechanical device arts. The term chip refers to the one-piece electromechanical circuit package that includes one or more linear light modulator arrays formed on a single substrate, such as the conformal grating devices described in detail in commonly-assigned U.S. Pat. No. 6,411,425 (Kowarz et al.). The GEMS chip not only includes the elongated ribbon elements that form the light-modulating grating for light reflection and diffraction, but may also include the underlying circuitry that applies the electrostatic force that is used to actuate these ribbon elements. In manufacture, the tiny electronic and mechanical components that form the chip, such as the GEMS chip shown in the Kowarz et al. '425 patent, are fabricated onto a single substrate. The chip package also includes signal leads for interconnection and mounting onto a circuit board or other suitable surface.

Further detailed description of GEMS device architecture and operation is given in a number of commonly-assigned U.S. patents and published applications, including U.S. Pat. No. 6,307,663 (Kowarz); U.S. Pat. No. 6,663,788 (Kowarz et al.); and U.S. Pat. No. 6,802,613 (Agostinelli et al.). In GEMS devices, light is modulated by diffraction. On a GEMS chip, the linear array of conformal electromechanical ribbon elements, formed on a single substrate, provides one or more diffracted orders of light to form each line of pixels for line-scanned projection display.

In some embodiments, multi-linear GEMS chips can be of particular interest as linear light modulator arrays for stereoscopic dual-view display apparatus. Bilinear GEMS devices, as described in commonly-assigned U.S. Patent Application Publication No. 2007/0047061 (Kowarz), provide two separate electromechanical grating light modulator array sections, that is, two linear arrays of conformal electromechanical grating devices formed on a single substrate. Trilinear GEMS devices, having linear arrays of conformal electromechanical grating devices formed on a single substrate, are described in U.S. Pat. No. 7,274,500 (Kowarz) and can also be used in various embodiments.

In embodiments of the present invention, a single projector is used for displaying dual-view stereoscopic images to two or more unequal subsets of viewers. The image scene content that is displayed as left- and right-eye images to each subset of viewers generally differs between viewer subsets. In various embodiments, this difference can be based on variable viewer ability to fuse stereoscopic images, so that more or less horizontal disparity is provided for one viewer subset than for another, for example. Here, disjoint viewer subsets are defined according to viewer ability to fuse stereoscopic images. In other embodiments, some or all of the image scene content itself may vary, so that, for example, the scene that displays to viewer subset A is completely different in content from the scene that displays to viewer subset B. With dual-view stereoscopic images provided in this way, for example, viewer subset A watches a satellite launching while viewer subset B watches a sports event. In such embodiments, viewer subsets can be defined by other factors, such as in a gaming application, where viewer subsets A and B each see different content as players who compete in a video game. In another embodiment, viewer subset A may be defined by having paid a higher price to view a motion picture in stereo; viewer subset B may have a correspondingly less vivid view of the same scene content, but not in stereo, hence at a lower price. Different levels of image quality or color spectra could be provided for different viewer subsets on different channels. Or, in another cinematic embodiment, two defined viewer subsets A and B may be watching two entirely different motion pictures.

The schematic block diagram of FIG. 1 shows a stereoscopic display apparatus 10 of the present invention that provides dual-view stereoscopic display to two or more unequal subsets of viewers. Here, there are two viewer subsets A and B, each having at least one viewer. Viewer A has a first decoding device 66a that transmits a first stereoscopic image so that it can be received by viewer A, while blocking a second stereoscopic image. Viewer B has a second decoding device 66b that transmits the second stereoscopic image to viewer B, while blocking the first stereoscopic image. For this embodiment, a single projector 100 projects images onto a display surface 24, such as a conventional display screen. A control logic processor 20 is in communication with, or part of, projector 100 and is responsive to stored instructions for providing the succession of images to projector 100. Control logic processor 20 provides control signals, which may be wireless, to synchronize the timing of decoding devices 66a and 66b used by each viewer subset A and B, respectively.

Each decoding device 66a, 66b may be in communication with control logic processor 20 and may be synchronized with the timed sequence of projector 100. Depending on the configuration used and on how images are transmitted to each viewer, each decoding device 66a, 66b may be actuable to block one or more of the succession of images from any viewer in an alternate subset of viewers.

In the embodiment shown in FIG. 1, decoding devices 66a and 66b are electronically controlled shutter glasses, operatively responsive to signals from control logic processor 20 to change the opacity of left- and right-eye differentiating elements, shown here as lenses 72l and 72r in synch with the refresh rate used for providing images on display surface 24. It should be observed that other embodiments may use other types of differentiating elements either as viewer differentiating elements for viewer subsets A and B or as left- and right-eye differentiating elements, as is described in more detail subsequently.

In the context of the present disclosure, stereoscopic images are presented to viewer subsets on different "channels" or "sub-channels". Thus, the example shown in FIG. 1 has two stereoscopic channels, one for each of viewer subsets A and B.

As was described with reference to FIG. 1, embodiments of the present invention provide dual-view stereoscopic viewing capability, with the possibility of stereoscopic display adapted to the stereo perception characteristics of two or more subsets of viewers, labeled viewers or viewer subsets A and B in the present disclosure. Various techniques are employed in order to provide multiple stereoscopic views as well as, optionally, to provide non-stereoscopic viewing for viewers who do not fuse left- and right-eye images to perceive stereo images.

Figure 2A:
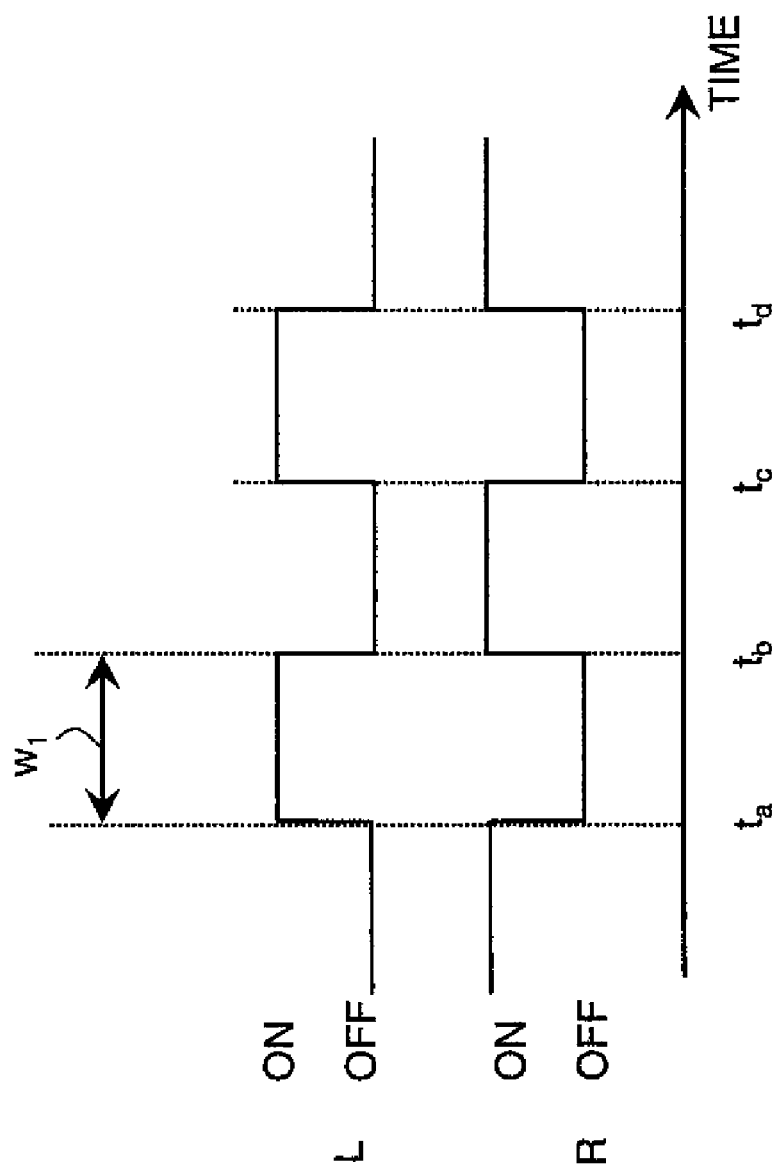
FIG. 2A is a prior art timing diagram showing conventional timing for a stereoscopic display.

In order to better understand how timing methods of the present invention offer enhanced stereoscopic imaging, it is instructive to briefly review conventional timing for stereoscopic viewing as currently practiced. Referring to the timing diagram of FIG. 2A, there is shown the refresh period that corresponds to conventional "page-flipping" timing that is used for stereoscopic display from a single projector. Here, the display of L and R images alternates so that, for example, for that half of the refresh period between time $t_a$ and $t_b$, the left-eye image displays; then, during the next half of the refresh period shown as time interval $t_b$ to $t_c$, the right-eye image displays. (The left eye's visibility is blocked by the shutter glasses during right-eye image display; similarly, the right eye is blocked by the shutter glasses during left-eye image display.) Interval timing for each half of the refresh period, shown at $w_1$ in FIG. 2A, is substantially equal for both left- and right-eye image display. Those skilled in the image display arts will recognize that waveforms shown for refresh periods in the present disclosure are idealized; there is necessarily some amount of delay between display of one image frame and the next. For example, each left- or right-eye image actually displays for substantially half of the refresh period, since recovery time is needed in order to provide the next image or image portion.

Figure 2B:
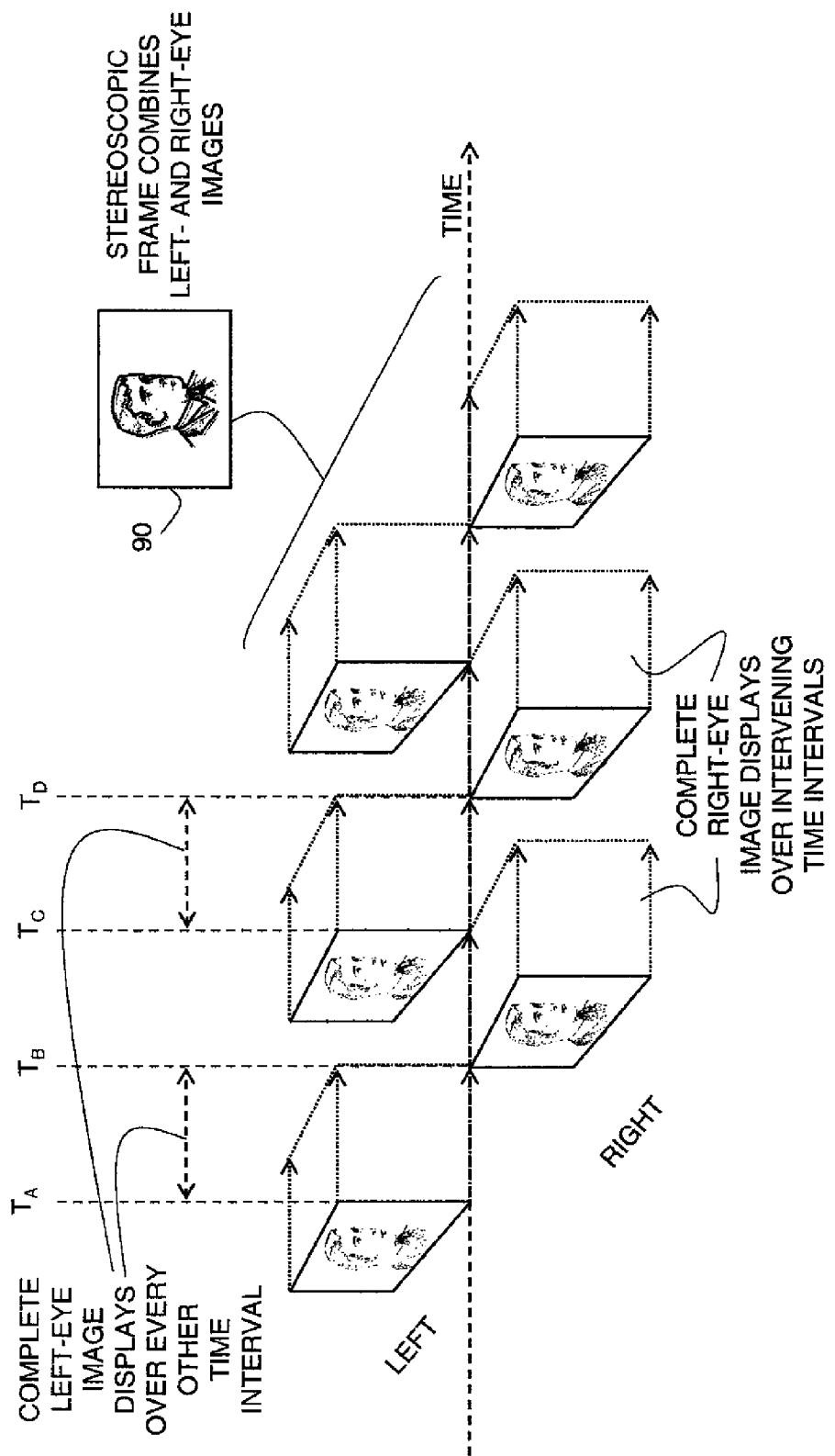
FIG. 2B shows the timing used for conventional page-flipping stereoscopic display according to the prior art.

FIG. 2B shows the page-flipping timing of FIG. 2A in a more graphic form and shows how L and R images are fused by the viewer to form a stereoscopic or 3-D display surface 90.

Figure 3A:
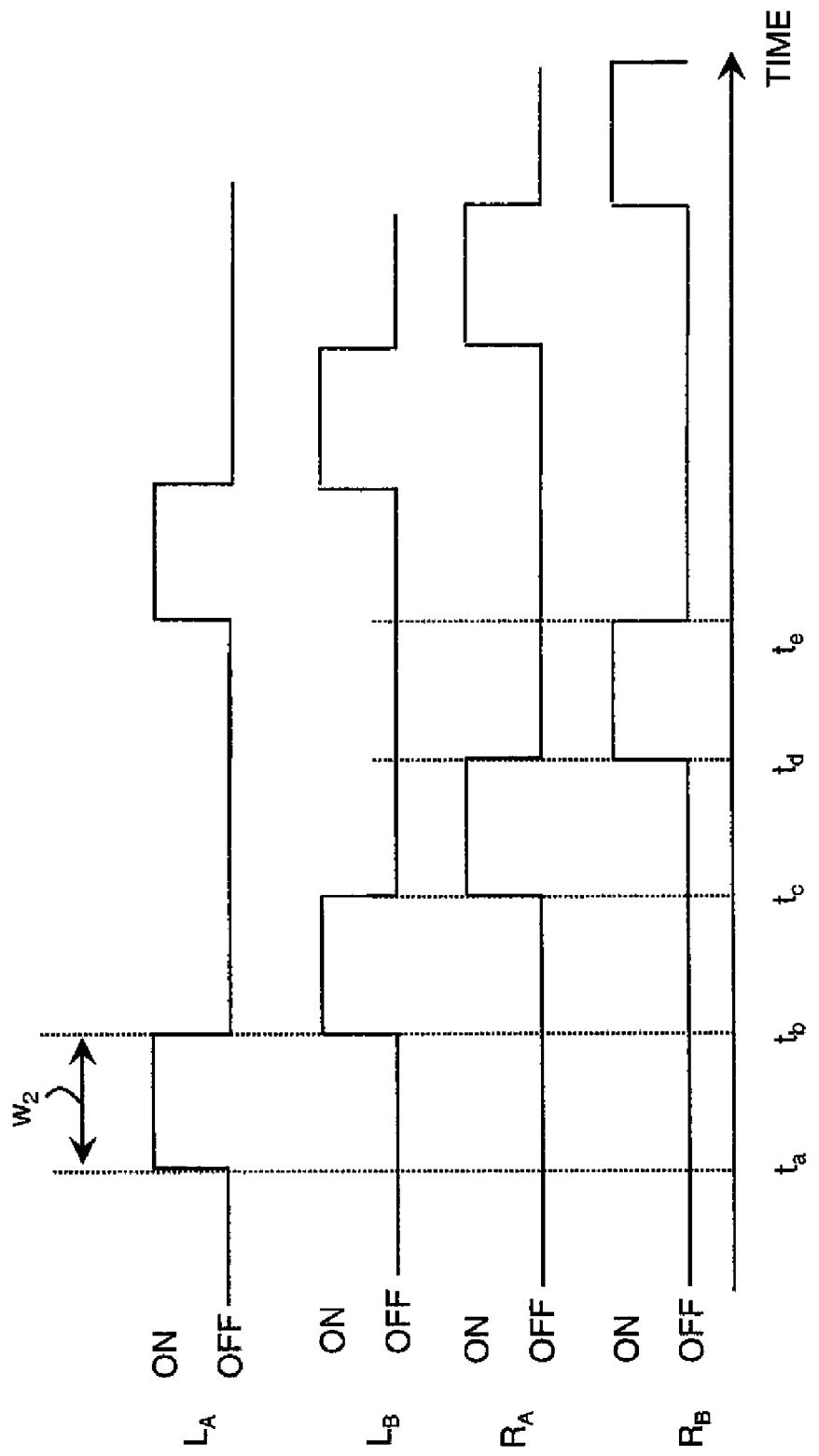
FIG. 3A is a prior art timing diagram showing conventional timing for a stereoscopic display that provides distinct views to two viewers.

Before moving to a description of timing as used in the present invention, it is further instructive to consider the multiplexed timing arrangement that has been proposed for display of either stereoscopic or dual images to two subsets of viewers. Referring to the timing diagram of FIG. 3A, timing for two subsets of viewers A and B is shown. Annotation is as follows:

$L_A$ indicates timing for the left-eye image to viewer subset A;

$R_A$ indicates timing for the right-eye image to viewer subset A;

$L_B$ indicates timing for the left-eye image to viewer subset B;

$R_B$ indicates timing for the right-eye image to viewer subset B.

Figure 3B:
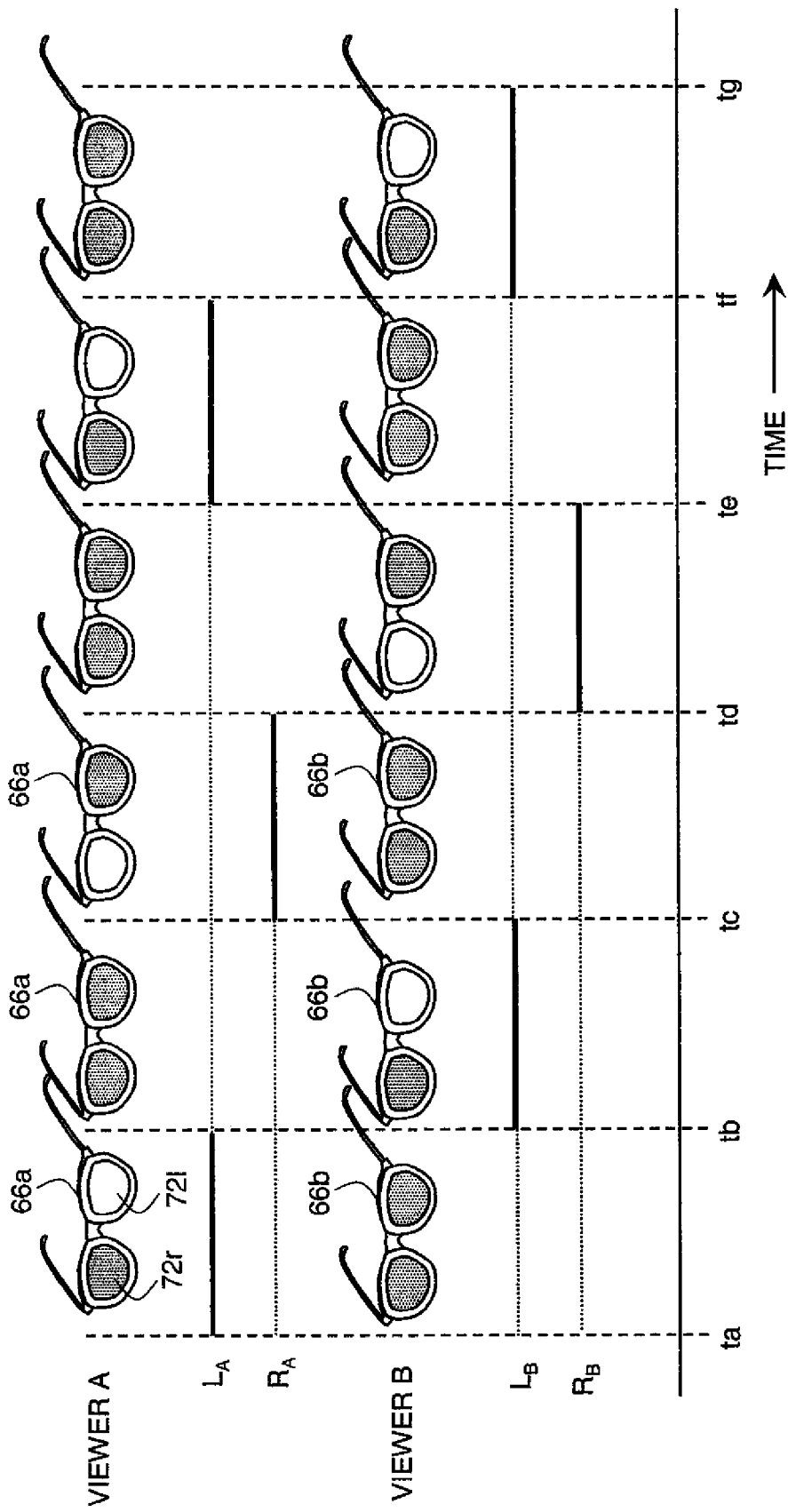
FIG. 3B is a prior art timing diagram showing conventional shutter glass timing for a stereoscopic display that provides distinct views to two viewers.

Times $t_a$, $t_b$, $t_c$, $t_d$, and $t_e$ demarcate the relative periods of the non-overlapping time intervals for display during one cycle of image presentation to both viewer subsets. The separation of left- and right-eye images uses shutter glasses synchronized to the timing of displayed images. FIG. 3B shows, in icon form, the blocked (shaded) and visible (unshaded) lens portions of shutter glasses that act as decoding devices 66a and 66b for each of viewer A and viewer B corresponding to this timing, with a horizontal bold line indicating the corresponding time interval for each shuttered lens. With this arrangement, a conventional stereoscopic display apparatus can be used to provide either stereoscopic display or dual-view display. Notably, however, this timing would not be advantageous, since the light level is severely limited; light is provided for only one-fourth, at most, of the time interval available for display of an image frame.

Unlike conventional stereoscopic or dual-view display strategies, embodiments of the present invention use a pair of differentiating elements in various combinations for both separating images according to viewer subset, that is, for whether an image is for viewer A or viewer B, and, given this viewer A/B separation, for then differentiating left- from right-eye images within each viewer subset. Embodiments of the present invention do this by providing a decoding device 66a, 66b to each viewer, as was described earlier with reference to FIG. 1. Each decoding device has the following functional components:

(i) a viewer differentiating element for receiving images intended for a viewer and blocking other images; and (ii) a left-eye differentiating element and a right-eye differentiating element for separating the left- and right-eye stereoscopic images respectively.

There are at least three types of differentiating elements that are available for embodiments of the present invention:

(a) shutter glasses, whose lens opacity varies synchronously with display of images to be received and images to be blocked;

(b) polarizers, typically in the form of lenses, where orthogonal polarization states are used for differentiation between images to be received by one viewer subset or, alternately, by the left or right eye of a viewer; and (c) spectral filters, typically also provided as lenses, that selectively transmit or block light according to wavelength. For a color image, generally, a spectral filter is used for each color channel.

Any individual embodiment uses one of the three types of differentiating elements (a), (>), or (c) as its viewer differentiating element (i) and a different one of the remaining differentiating elements (a)-(c) as its left- or right-eye differentiating element. The types of differentiating elements selected for each functional component then determine both how the stereoscopic images are formed at the projector or other display device and how decoding devices 66a and 66b (FIG. 1) are configured.

Figure 4A:
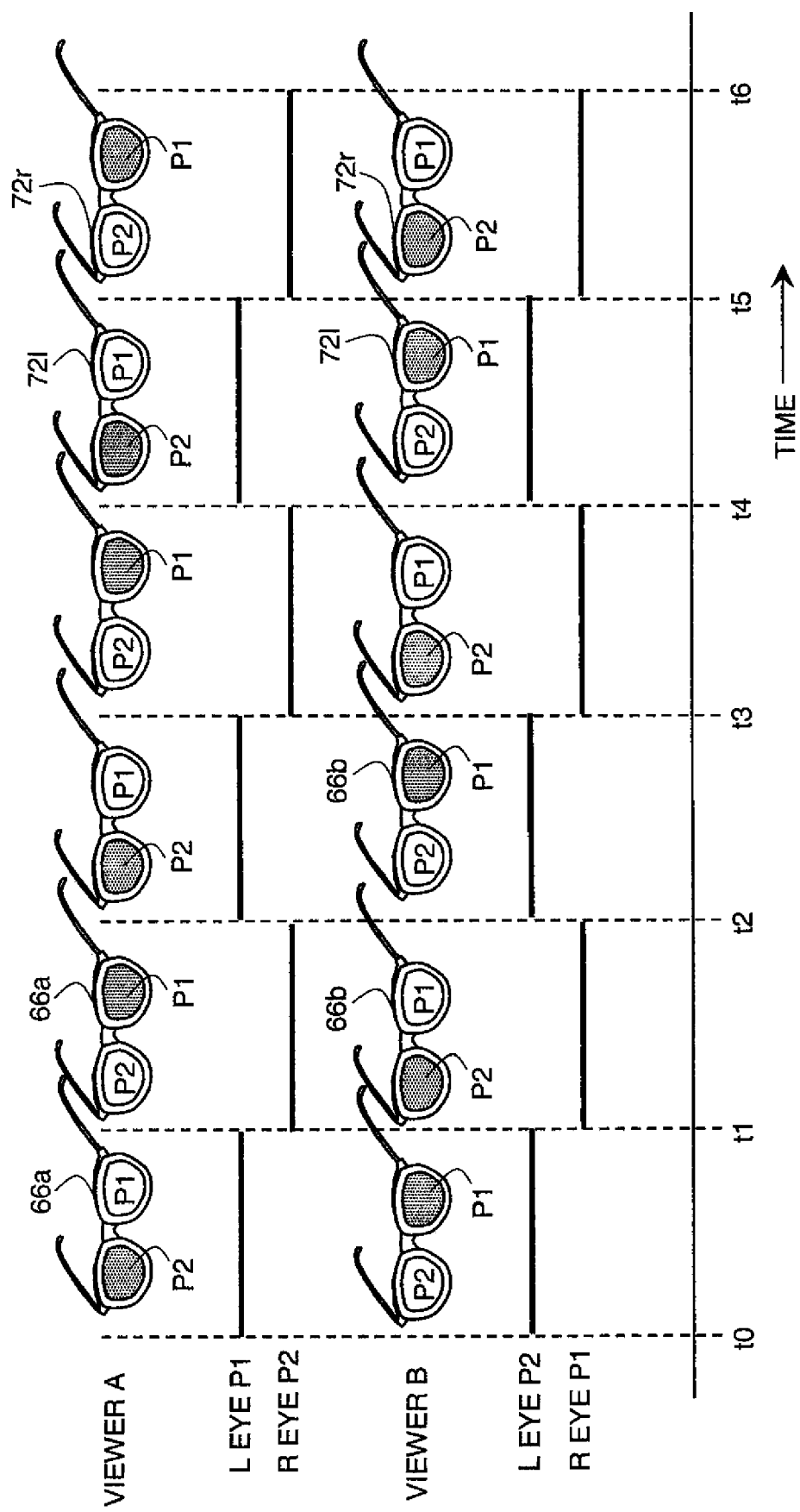
FIG. 4A is a timing diagram showing shutter glasses timing for a dual-view stereoscopic display.

For example, apparatus and methods of embodiments of the present invention may combine shutter glass operation with polarization or spectral filter image separation techniques in order to provide dual-view stereoscopic imaging to two or more sets of viewers. The timing diagram of FIG. 4A shows an embodiment that uses shutter glasses as viewer differentiating elements in decoding devices 66a and 66b, wherein lenses 72l and 72r, acting as left- and right-eye differentiating elements, are polarized, with the polarization transmission axis of lens 72l orthogonal to the polarization transmission axis of lens 72r. In the notation used in FIG. 4A and in subsequent description, polarization states denoted P1 and P2 are orthogonal. In this embodiment, using polarized light allows each viewer group to have either a left-eye image or a right-eye image displayed at a time. Thus, for example, during that half of the refresh period shown as time interval t0-t1, viewer A is presented a left-eye image having polarization P1. Viewer B receives a right-eye image having polarization P2 during this same time interval. Then, at time t1, both sets of shutter glasses switch to their alternate state. During time interval t1-t2, for the other half of the refresh period, viewer A is presented a right-eye image having polarization P2. Viewer B is then presented a left-eye image having polarization P1.

Figure 4B:
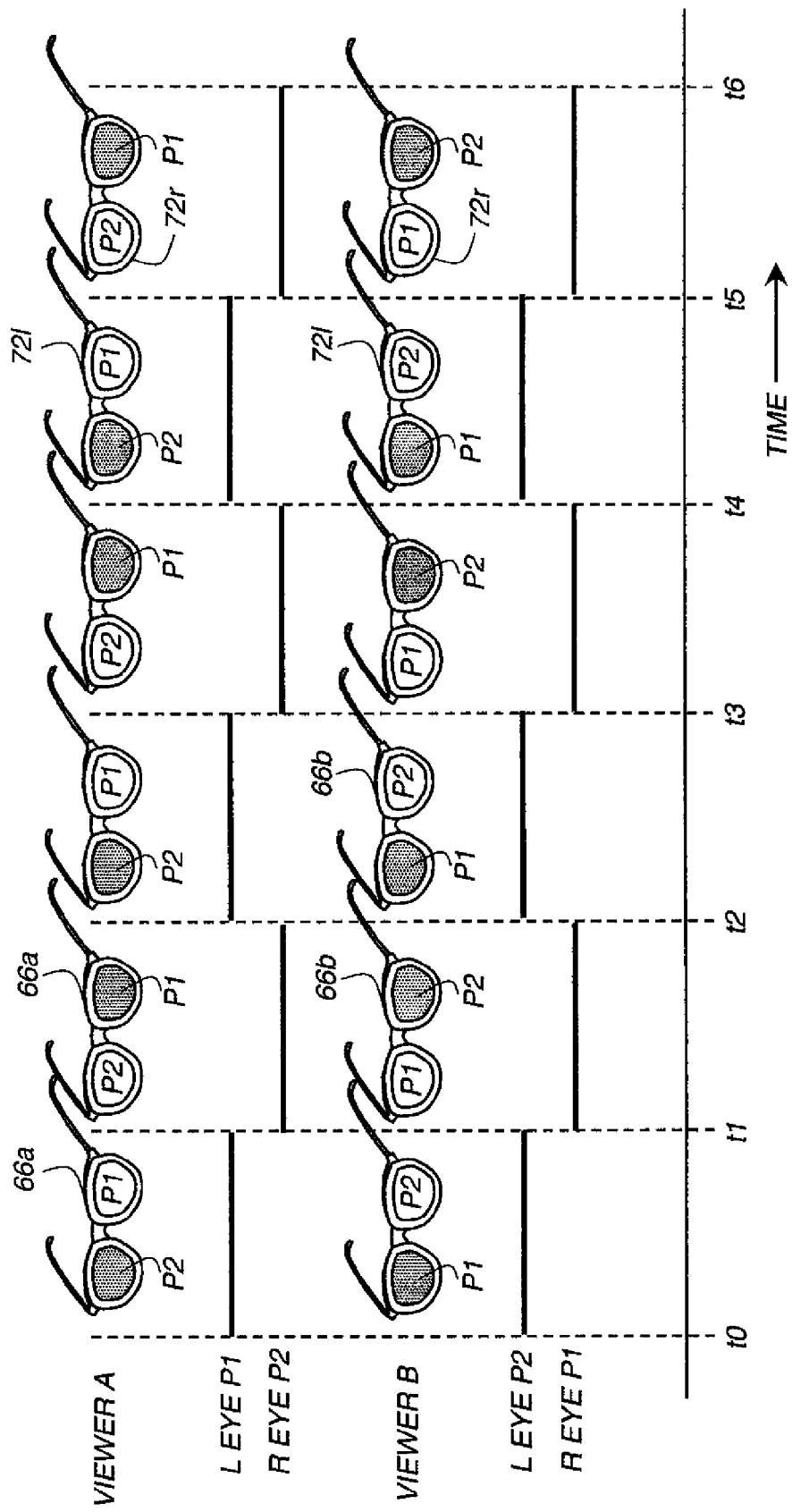
FIG. 4B is a timing diagram showing shutter glasses timing for an alternate configuration of a dual-view stereoscopic display.

FIG. 4B shows an alternate timing diagram with the same shutter glasses timing used for both viewer groups A and B, but with the polarization states of lenses 72l and 72r different for each viewer group. Here, during time interval t0-t1, viewer A is presented a left-eye image having polarization P1. Viewer B receives a left-eye image having polarization P2 during this same time interval. Then, at time t1, both sets of shutter glasses switch to their alternate state. During time interval t1-t2, for the other half of the refresh period, viewer A is presented a right-eye image having polarization P2. Viewer B is then presented a right-eye image having polarization P1. As noted earlier, timing waveforms shown herein are idealized images for left- and right-eyes display for substantially half the refresh period; in practice, some amount of time is lost as the next portion of the image is loaded and as image modulating components make transitions from one image to the next.

In order to provide dual-view stereoscopic imaging from a single projector with either the timing of FIG. 4A or 4B, it is necessary to be able to project separate images of orthogonal polarization states at the same time. The schematic diagram of FIG. 5 shows internal components of display apparatus 10 that provide this imaging capability.

Figure 5:
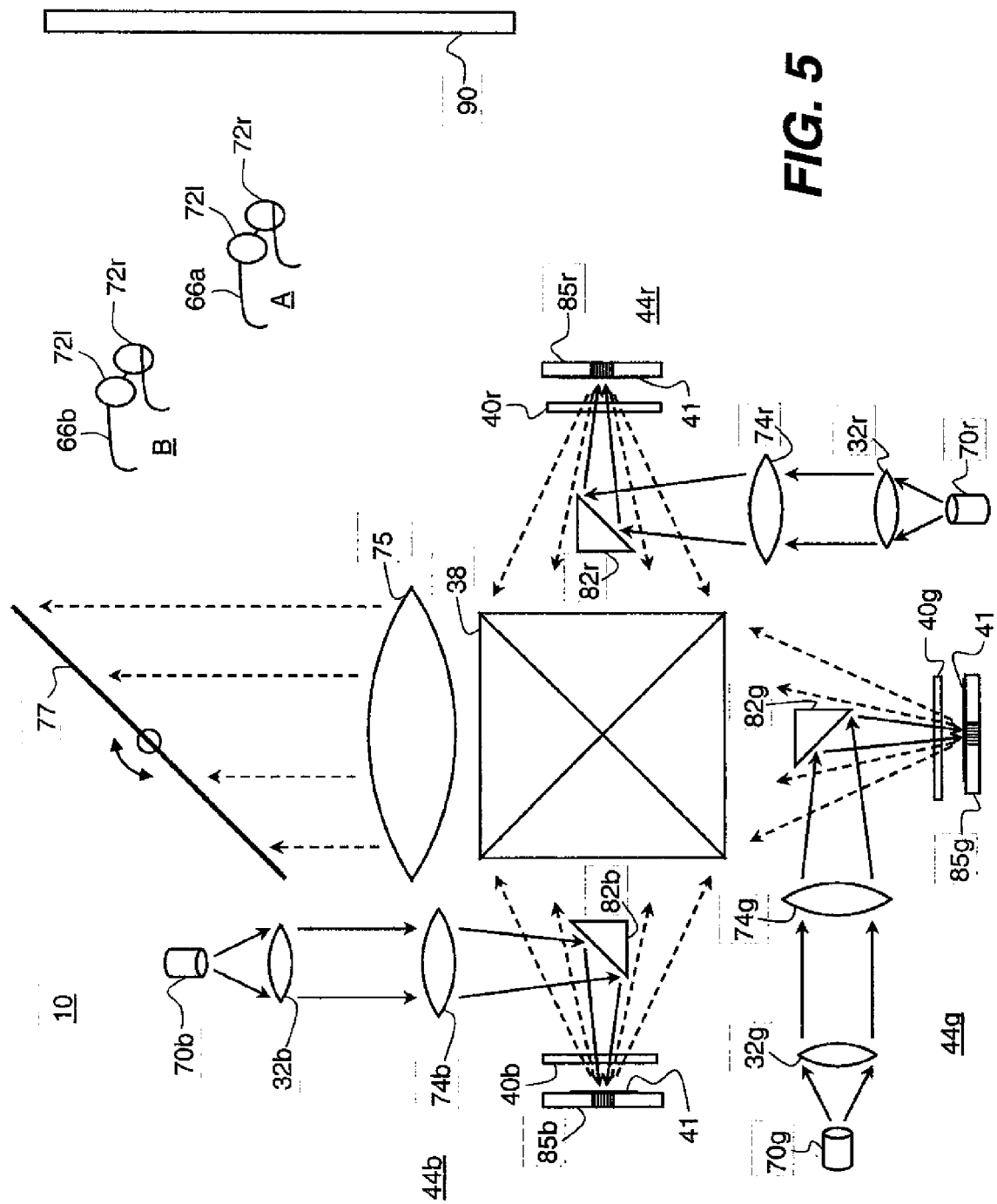
FIG. 5 is a schematic diagram showing a display apparatus for dual-view stereoscopic projection.

Display apparatus 10 of FIG. 5 has three color channels for light modulation, a red channel 44r, a green channel 44g, and a blue channel 44b. The overall operation of each color light modulation channel follows the general pattern described in more detail in commonly-assigned U.S. Pat. No. 6,678,085 (Kowarz et al.) and outlined briefly herein.

For red color light modulation in red channel 44r, a red light source 70r, typically a laser or more preferably one or more arrays of lasers, provides illumination that is conditioned through a spherical lens 32r and a cylindrical lens 74r and directed towards a turning mirror 82r. Light reflected from turning mirror 82r is modulated by diffraction at an electromechanical grating light modulator 85r. Modulated diffracted light from electromechanical grating light modulator 85r is diffracted past turning mirror 82r and to a color combiner 38, such as an X-cube or other dichroic combiner. The modulated light from color combiner 38 is then directed to projection optics 75, which may include an optional cross-order filter (not shown), to a scanning mirror 77 for projection onto a display surface 90. Green color modulation uses a similar set of components for providing light to color combiner 38, with a green light source 70g, typically a laser or more preferably one or more arrays of lasers, providing illumination through a spherical lens 32g and a cylindrical lens 74g and directed towards a turning mirror 82g. Light reflected from turning mirror 82g is modulated by diffraction at an electromechanical grating light modulator 85g. Modulated diffracted light from electromechanical grating light modulator 85g is diffracted past turning mirror 82g and to color combiner 38. Similarly, blue light source 70b, typically a laser or more preferably an array of lasers, provides illumination through a spherical lens 32b and a cylindrical lens 74b and directs light towards a turning mirror 82b. Light reflected from turning mirror 82b is modulated by diffraction at an electromechanical grating light modulator 85b, diffracted past turning mirror 82b and to color combiner 38. In the embodiment shown, each color channel has an additional optional component, striped polarization modifier 40r, 40g, or 40b that enables projection of images having orthogonal polarizations using a GEMS device or similar electromechanical grating light modulator 85. Preferably, the striped polarization modifiers 40r, 40g, 40b are optical retarders. Use of retarders instead of polarizers can lead to improved optical efficiencies. The striped retarders can also be integrated as part of the GEMS device, electromechanical grating light modulator 85, by using stripe-patterned ¼ wave retarders on the GEMS device cover glass 41, typically used to seal the electromechanical grating light modulator 85 from the ambient air. When polarization is used as a differentiating characteristic, providing orthogonal polarization viewing for either different sets of viewers or for left- and right-eye differentiation for 3D viewing, display surface 90 is preferably designed to maintain the polarization state of the projected light.

Figure 7:
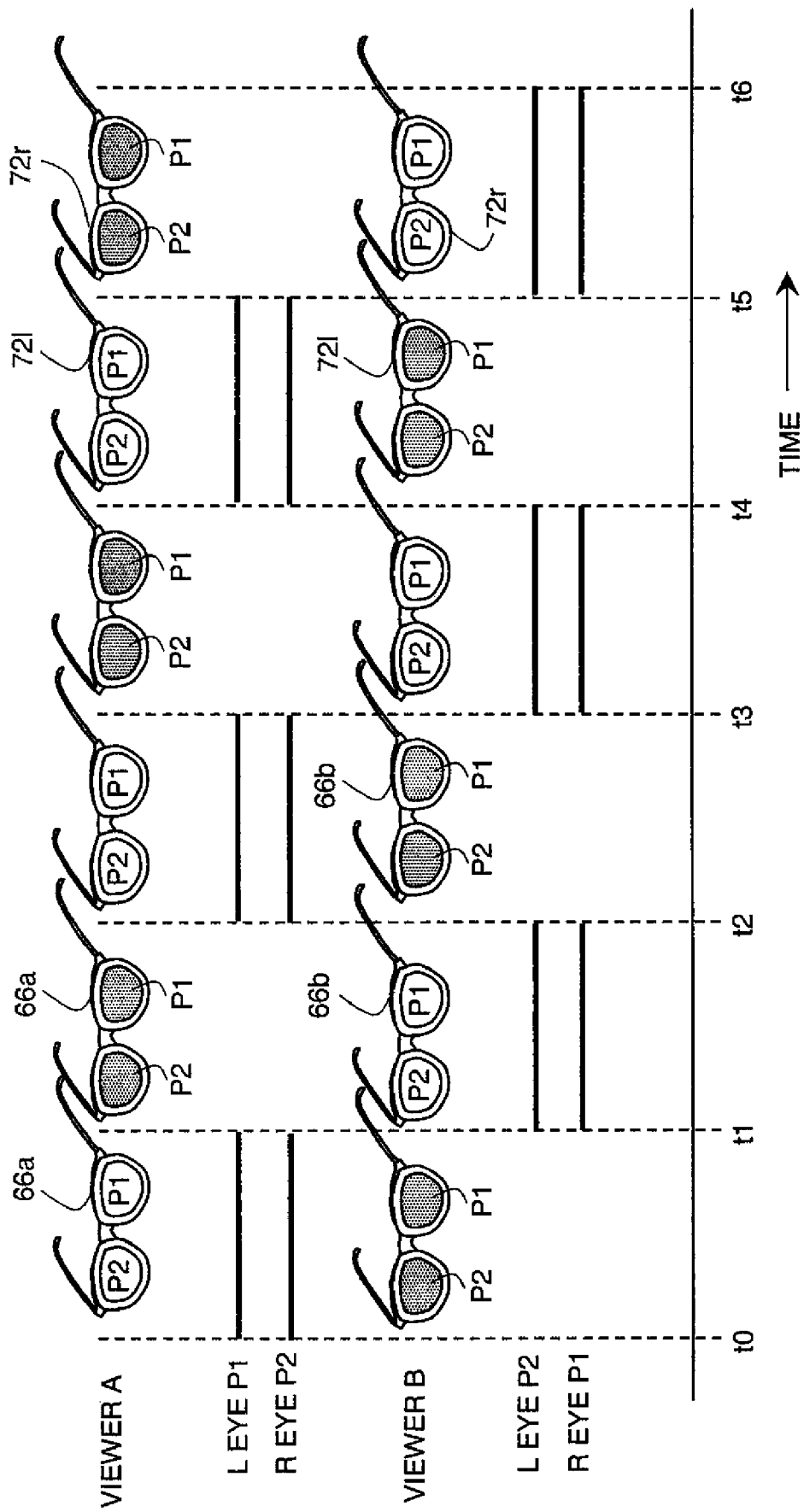
FIG. 7 is a timing diagram that shows shutter glass timing in an alternative embodiment.

Instead of using the striped retarder 40r, 40g, and 40b in a striped pattern, an in-line electro-optic switchable ½ wave retarder for use in transmission can be placed between turning mirrors 82r, 82g, and 82b and color combiner 38. This approach requires that only one polarization be shown at each half-frame interval of the refresh period and is not compatible with the timing diagram shown in FIG. 4A or 4B, but would be compatible with the timing diagram shown subsequently in FIG. 7.

FIG. 6A shows a plan view of a small portion of a striped retarder 40 and shows striped retarder 40 as it lies atop an electromechanical grating light modulator 85, for example, a GEMS device, within each of the color channels. Stripes 114 are ¼ wave retarders, spaced one pixel apart at the pixel-to-pixel dimension d of the GEMS electromechanical grating light modulator 85. Spaces 116 are transparent. Thus, incoming illumination for every other GEMS pixel undergoes a change of its polarization state on transmission through each stripe 114. For the case where input polarization is linearly polarized, with the polarization axis oriented at 45 degrees with respect to the fast or slow axis of the retarder stripe 114, then the reflected or diffracted light from every other pixel also transmits back through stripe 114, undergoing further retardation, so that the resulting light for that pixel has linear orthogonal polarization relative to its neighbor. To achieve the orthogonal polarization states just described, the surface of the GEMS device that receives light must comprise a metallic thin film and the incoming light must be at least at near normal incidence.

Figure 6C:
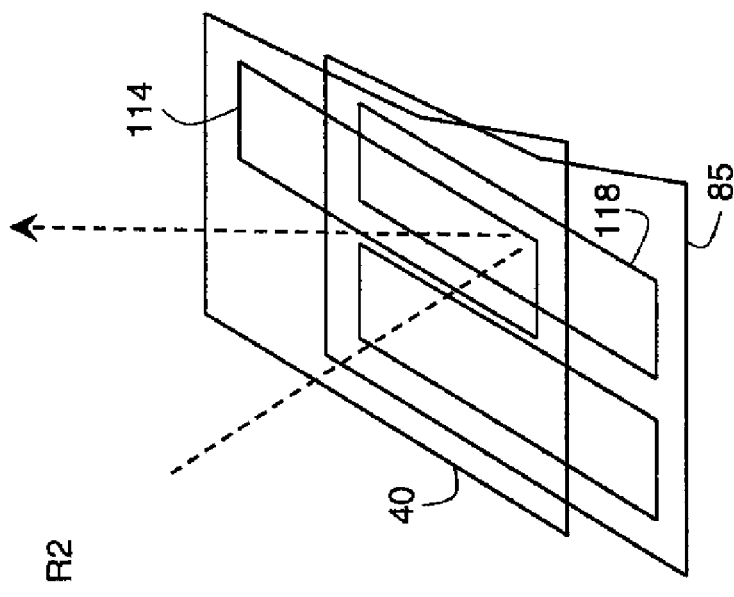
FIGS. 6B and 6C show light paths for adjacent pixels using different polarization states.
Figure 6B:
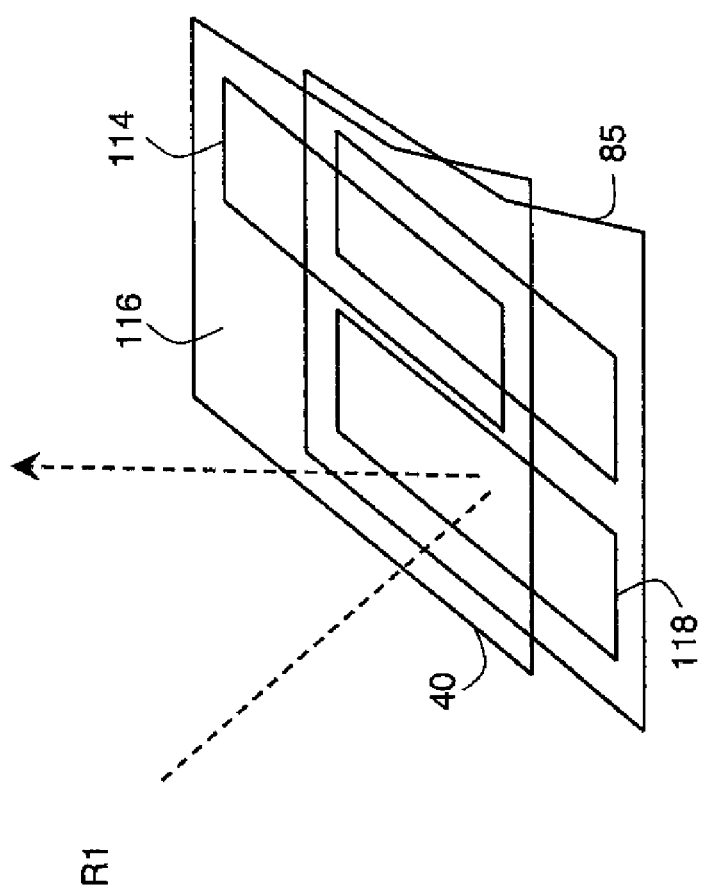

The perspective views of FIGS. 6B and 6C show the treatment of light for two adjacent pixel-modulating ribbons 118. In FIG. 6B, a light ray R1 transmits through space 116 of striped polarizer 40. The modulated light that returns from the GEMS device has the same polarization as it did initially. In the perspective view of FIG. 6C, however, a light ray R2 is directed through stripe 114, modulated at ribbon 118, and transmitted back through stripe 114. This provides light of orthogonal polarization to the light ray R1 that was shown in FIG. 6B. By repeating this pattern, striped polarization modifier 40 thus enables a single GEMS device to provide, at the same time, two different images having orthogonal polarization states. These interleaved images are offset from each other by one GEMS pixel.

A particularly advantaged embodiment of the striped retarder 40 is one that comprises alternating +⅛ wave and −⅛ wave retarder striped portions, there being no non-retarding portions corresponding to spaces 116 above. Each pixel of electromechanical grating light modulator 85 has its own corresponding retarder stripe 114 of striped retarder 40. Thus, the +⅛ wave and −⅛ wave retarder portions correspond with a first and second set of interleaved pixels, respectively, of electromechanical grating light modulator 85. After one pass through retarder 40, incoming linearly polarized illumination is converted to two states of elliptical polarization, one for the +⅛ wave portions and a second for the −⅛ wave portions. The modulated light returned from electromechanical grating light modulator 85 again traverses the same retarder portion. Upon this second pass through retarder 40, cumulative retardation is, respectively, +¼ and −¼ wave for alternate pixels, with the result that alternating interleaved pixels along the array have left and right circular polarization states. Thus, interleaved images having left-handed and right-handed circular polarization states can be projected onto display surface 90. Similarly, there is a requirement that light-receiving surface of electromechanical grating light modulator 85 comprise a metallic thin film and that incoming linearly polarized light has a polarization direction that is at 45 degrees to the preferred axes of the +⅛ and −⅛ wave retarders.

In an embodiment similar to that shown in FIGS. 4A and 4B, images for viewers A and B could be differentiated by polarization, that is, using polarizers as first and second viewer differentiating elements, so that both lenses 72l and 72r for viewer A exhibit the P1 polarization state, while both lenses 72l and 72r for viewer B exhibit the P2 polarization state. An alternative timing arrangement using polarization is shown in the timing diagram of FIG. 7. In this embodiment, the shutter glasses for each viewer operate to block both lenses 72l and 72r at once during half of the refresh period to provide dual-view operation. Polarization then provides the stereo viewing capability for each viewer.

Figure 8:
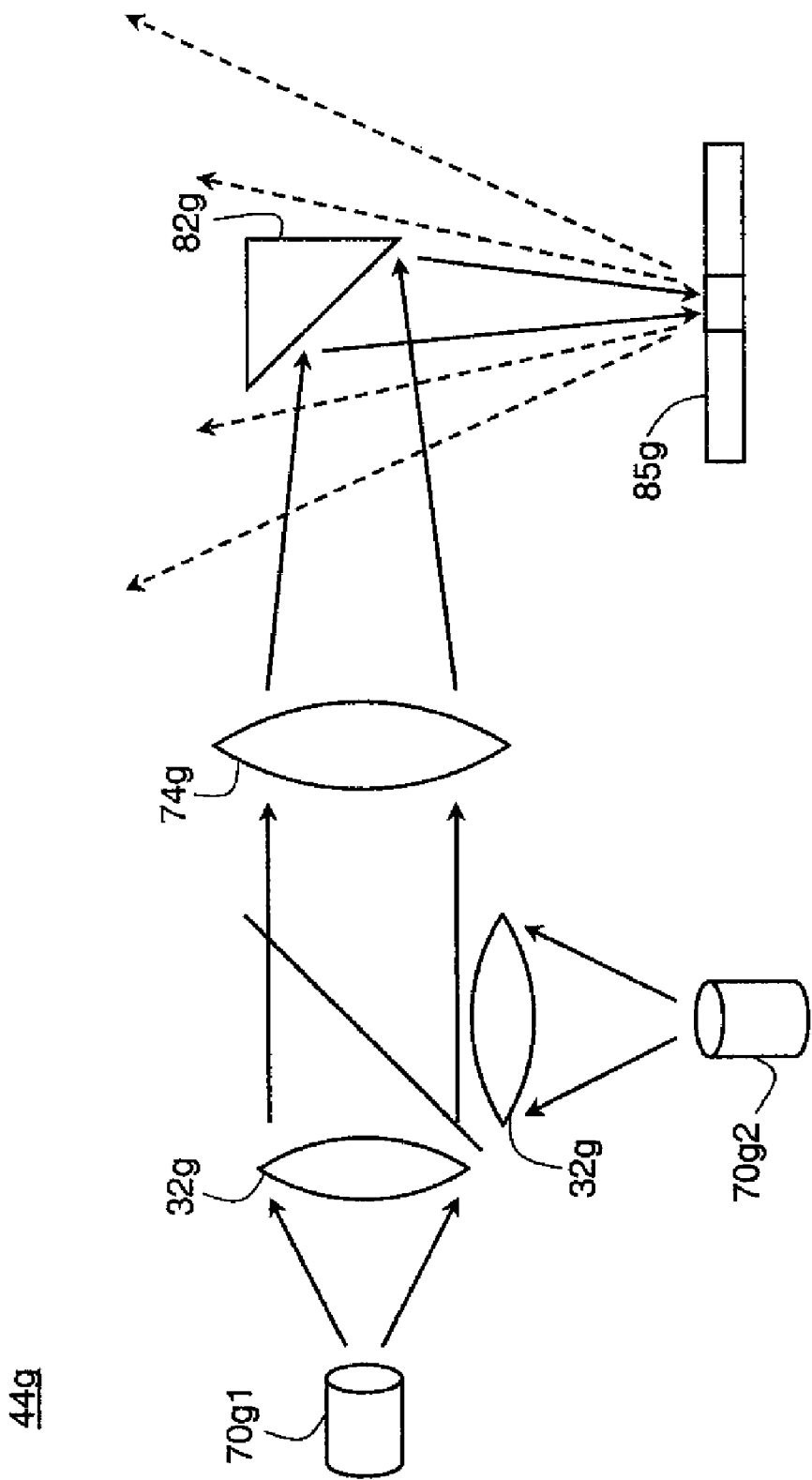
FIG. 8 is a schematic diagram showing a single color channel where spectral separation is used as a differentiating characteristic.

Another alternative embodiment uses spectral separation, with spectral filters providing the right- and left-eye differentiating elements instead of separation using polarization, as was described with reference to FIGS. 4A-6B. Referring back to the timing diagram of FIGS. 4A and 4B, the shutter glasses of decoding devices 66a and 66b have filtered lenses 72l and 72r for selectively transmitting different spectral components for each primary color. In order to provide this capability, each color channel would have two different light sources, one for the viewer A subset, one for the viewer B subset. FIG. 8 shows how this change is provided for green channel 44g in one embodiment. A light source 70g1 is energized during the intervals for viewing by viewer A; a light source 70g2 is energized during the alternate cycle. This same pattern would apply for all three or more color channels.

EMBODIMENTS WITHOUT SHUTTER GLASSES

In another embodiment, images for viewer sets A and B are distinguished by using filter glasses or other decoding devices that transmit different spectral bands. Thus, viewer differentiating element ((i) above) uses spectral filters ((c) above) in this embodiment. Within each viewer set, left- and right-eye images are then separable by having different polarization states. In the projection apparatus, this can be accomplished by adding striped polarizer 40 to each color channel, along with the additional light source, as shown for green channel 44g in the example of FIG. 9. On the viewer side, FIG. 10 shows spectral bands and polarizer arrangements for decoding devices 66a and 66b for such an embodiment.

Figure 11:
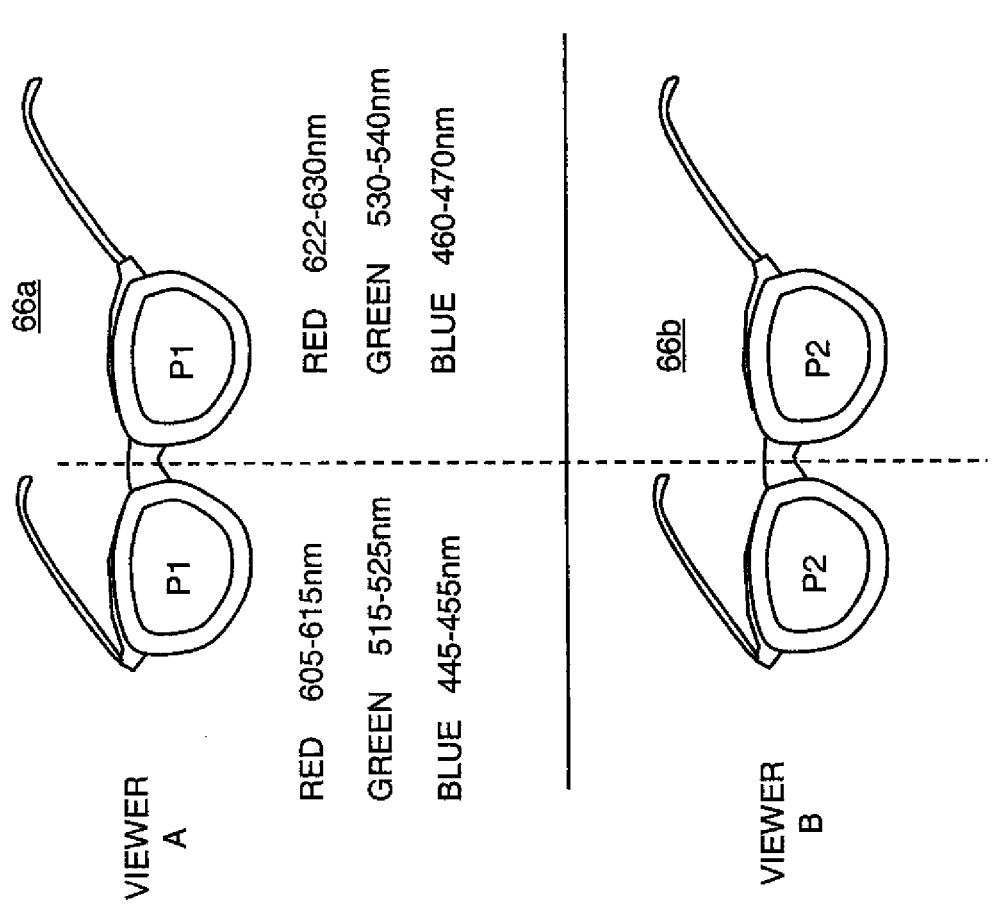
FIG. 11 is a block diagram showing decoding devices for different viewer subsets in an alternative arrangement using a combination of polarization and spectral separation as differentiating characteristics.

Another alternative embodiment uses polarization to distinguish viewer sets A and B, then uses filters as decoding devices for left- and right-eye image separation. Thus, viewer differentiating element ((i) above) uses polarization ((b) above) and left- and right-eye differentiating elements ((ii) above) use spectral filters ((c) above) in this embodiment. This embodiment would use the same component changes in each channel noted earlier in FIG. 9. FIG. 11 shows exemplary spectral band and polarizer arrangements for decoding devices 66a and 66b for such an embodiment. With this arrangement, shutter glasses are not needed. However, refresh timing rates for the video images are still maintained, so that left- and right-eye images, for example, may still be displayed over different portions of the refresh period.

Embodiments of the present invention use a single display apparatus 10 for stereoscopic dual-view imaging. These embodiments require display refresh rates compatible with stereoscopic imaging. The refresh rate for each eye must be sufficient for avoiding flicker; typically refresh rates at or near 60 Hz are used with GEMS and related electromechanical grating light modulators.

Figure 12:
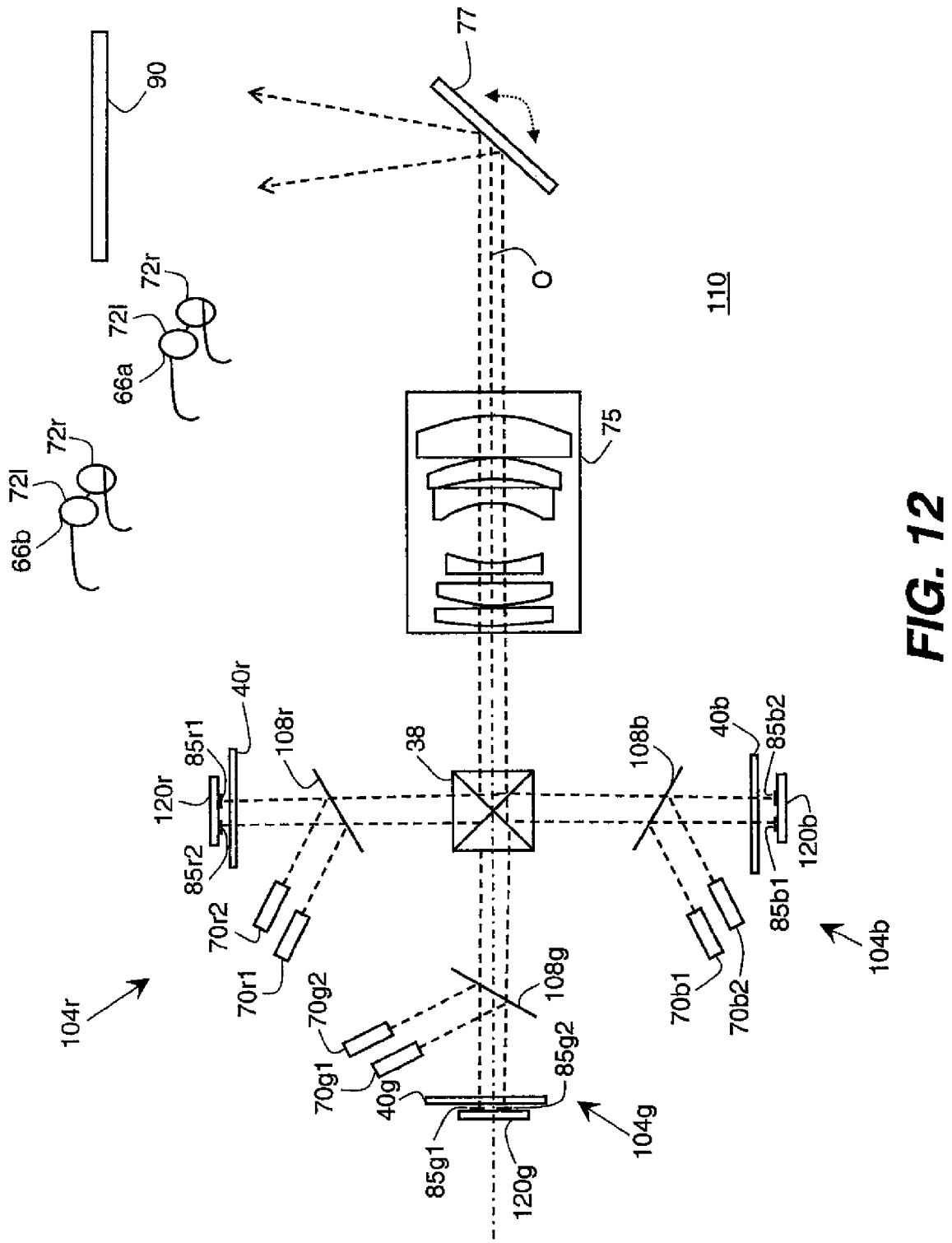
FIG. 12 is a schematic diagram showing an alternate embodiment of a display apparatus for dual-view stereoscopic projection.

Display apparatus 110 of FIG. 12 has three color channels, a red channel 44r, a green channel 44g, and a blue channel 44b. Each of the three color channels has a pair of lasers 70b1 and 70b2, 70g1 and 70g2, and 70r1 and 70r2 which are offset in wavelength slightly for selectively transmitting different spectral components for each primary color. Each of the GEMS chips 120r, 120g and 120b has a bilinear GEMS array with pairs of bilinear electromechanical grating light modulators, 85r1 and 85r2 for the red channel, 85g1 and 85g2 for the green channel, and 85b1 and 85b2 for the blue channel. Laser light from light sources 70r1 and 70r2 is reflected from turning mirror 108r and is modulated by diffraction at electromechanical grating light modulators 85r1 and 85r2. Modulated diffracted light from electromechanical grating light modulators 85r1 and 85r2 are diffracted past turning mirror 108r and to a color combiner 38 where modulated diffracted light from the three color channels are combined. The modulated light from color combiner 38 is then directed to projection optics 75, which may include an optional cross-order filter (not shown), to a scanning mirror 77 for projection onto a polarization maintaining display surface 90. The embodiment of FIG. 12 offers the advantage of 100% light utilization all the time for both sets of stereo viewers. Wavelength variation can be used for stereo and polarization for different sets of viewers as shown in FIG. 11 or polarization can be used for stereo and wavelength for different viewers as shown in FIG. 10.

Figure 13:
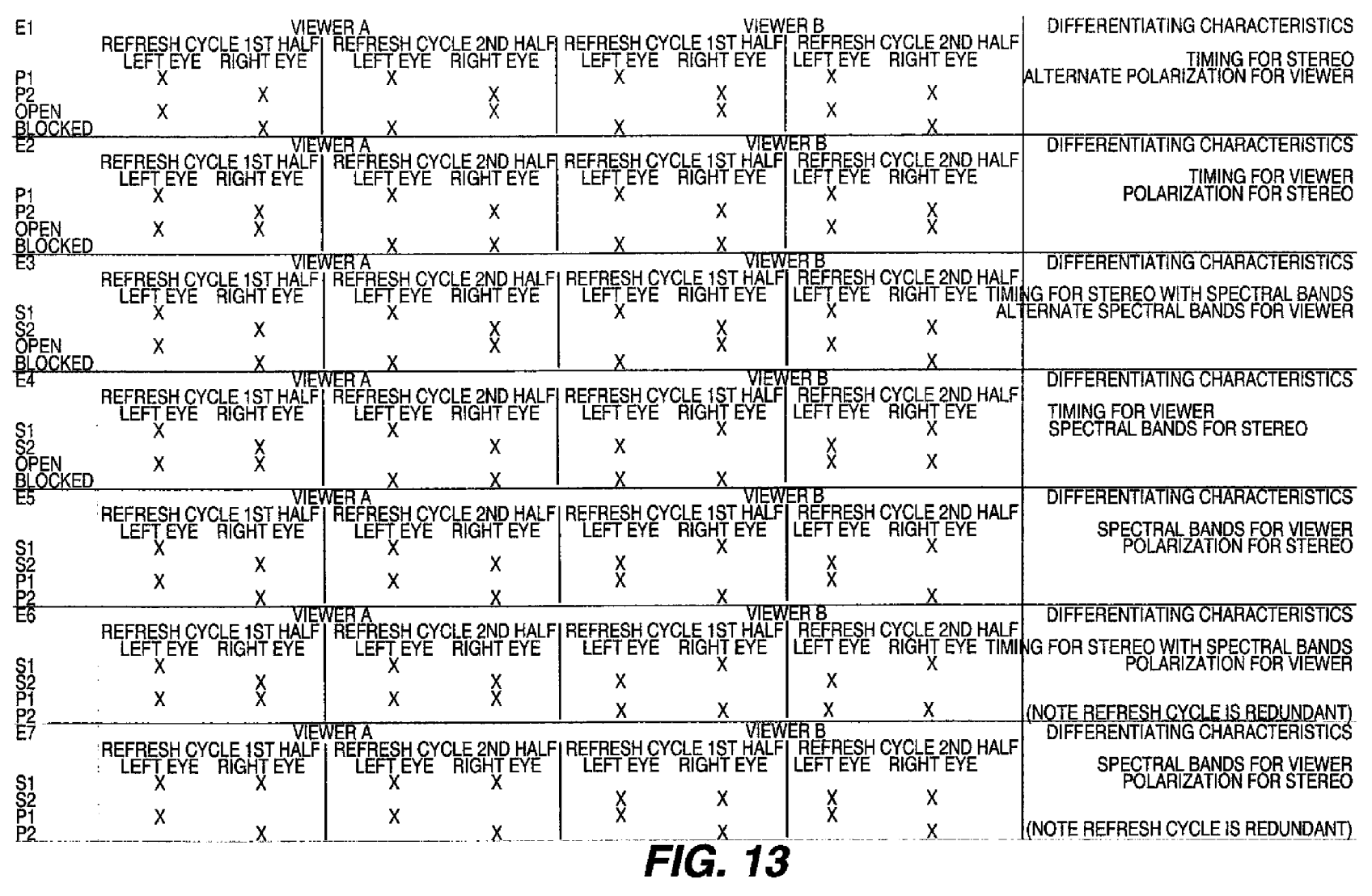

In embodiments of the present invention, at least two distinct stereoscopic images are displayed during a complete image refresh cycle. Each individual subset of viewers uses a decoding device to filter out or otherwise block one of the stereoscopic views, so that viewers in the subset see a single stereoscopic view. The decoding devices provide two types of separation mechanisms, one to differentiate between viewer subsets, the other to differentiate between left- and right-eye images within each viewer subset. The image refresh cycle or period may have one or more partial cycles. The table given in FIG. 13 provides a summary of seven different embodiments of this invention, labeled E1-E7. P1 and P2 are orthogonal polarizations, S1 and S2 are different sets of RGB spectral bands, "Open" and "Blocked" are for shutter glasses being opened or closed.

The discussion of each of the embodiments shown in FIG. 13 that follows uses, by way of example, the function of displaying an image with 1920 pixels horizontally and 1080 pixels vertically using a GEMS device. In embodiments for dual view stereo display, an image refresh cycle can have two half cycles in order to display two distinct stereo images to each of the two sets of viewers. In some of the embodiments listed in FIG. 13, the image refresh cycle only requires one of the half cycles so that the image can be either updated faster or the half cycle can be expanded to a longer duration. For display, it is desirable to have the image refresh cycle at a frequency of at least about 60 Hz and to have the refresh half cycles at least 120 Hz. Timing options and display requirements for scanning stereoscopic images with GEMS are described in commonly-assigned copending U.S. patent application Ser. No. 12/047,605 (Marcus et al.).

Embodiments E1 and E2 shown in FIG. 13 may use the apparatus shown in FIG. 5 with a GEMS device having 2160 pixels with the set of odd-numbered pixels modulating light of polarization P1 and the even-numbered pixels of polarization P2. Embodiment E1 uses polarization as the differentiating characteristic to distinguish left eye and right eye stereoscopic pairs for each set of viewers while using timing of shutter glasses to alternate between eyes. During the first half of the image refresh cycle, the odd-numbered GEMS pixels are used to display the left-eye image for the first set of viewers using P1 polarization and the even-numbered pixels are used to display the right-eye image for the second set of viewers (B) using P2 polarization. During the second half of the image refresh cycle, the even-numbered GEMS pixels are used to display the right-eye image for the first set of viewers using P2 polarization and the odd-numbered pixels are used to display the left-eye image for the second set of viewers (B) using P2 polarization. Polarizers in the decoding devices ensure that the left eye receives only light of the P1 polarization and the right eye receives light of only P2 polarization. Electro-optic shutters in the decoding devices are used to block light intended for the first set of viewers (A) from being seen by the second set of viewers (B) and vice versa. During the first half of the image refresh cycle or refresh period (labeled "refresh cycle $1^{st}$ half"), the right eye of the first set of viewers (A) is blocked and the left eye of the second set of viewers (B) is blocked when using their respective decoding devices. During the second half of the image refresh cycle or refresh period (labeled "refresh cycle $2^{nd}$ half") the left eye of the first set of viewers (A) is blocked and the right eye of the second set of viewers (B) is blocked when using their respective decoding devices. Thus, in one complete image cycle, both A and B sets of viewers see distinct stereoscopic images.

Embodiment E2 shown in FIG. 13 uses polarization to distinguish left eye and right eye stereoscopic pairs for each set of viewers while using timing to alternate between viewers during each half of the image refresh cycle. During the first half of the image refresh cycle the odd-numbered GEMS pixels are used to display the left-eye image for the first set (A) of viewers using P1 polarization and the even-numbered pixels are used to display the right-eye image for the first set of viewers (A) using P2 polarization. Both eyes of the second set of viewers (B) are blocked during the first half of the image refresh cycle. During the second half of the image refresh cycle, the odd-numbered GEMS pixels are used to display the left-eye image for the second set (B) of viewers using P1 polarization and the even-numbered pixels are used to display the right-eye image for the second set of viewers (B) using P2 polarization. Both eyes of the first set of viewers (A) are blocked during the second half of the image refresh cycle. Thus, in one complete image cycle, both A and B sets of viewers see distinct stereoscopic images.

Embodiments E3 and E4 shown in FIG. 13 use spectral band differences to display stereo images with different timing. Embodiments E3 and E4 may use the apparatus shown in FIG. 12 without the optional striped polarization modifiers 40r, 40g, and 40b. Each of the bilinear GEMS device pairs would have 1080 pixels and receive light of one spectral band S1 or S2 used for separating left- and right-eye stereoscopic images. In Embodiment 3, during the first half of the image refresh cycle the left-eye image for the first set of viewers (A) is displayed using spectral band S1 while the right-eye image of the first set of viewers (A) is blocked and the right-eye image for the second set of viewers (B) is displayed using spectral band S2 while the left-eye image for the second set of viewers (B) is blocked. During the second half of the image refresh cycle, the right-eye image for the first set of viewers (A) is displayed using spectral band S2 while the left-eye image for the first set of viewers (A) is blocked and the left-eye image for the second set of viewers (B) is displayed using spectral band S1 while the right-eye image of the second set of viewers (B) is blocked. Thus in one complete image cycle, both sets of viewers see distinct stereoscopic images.

Figure 9:
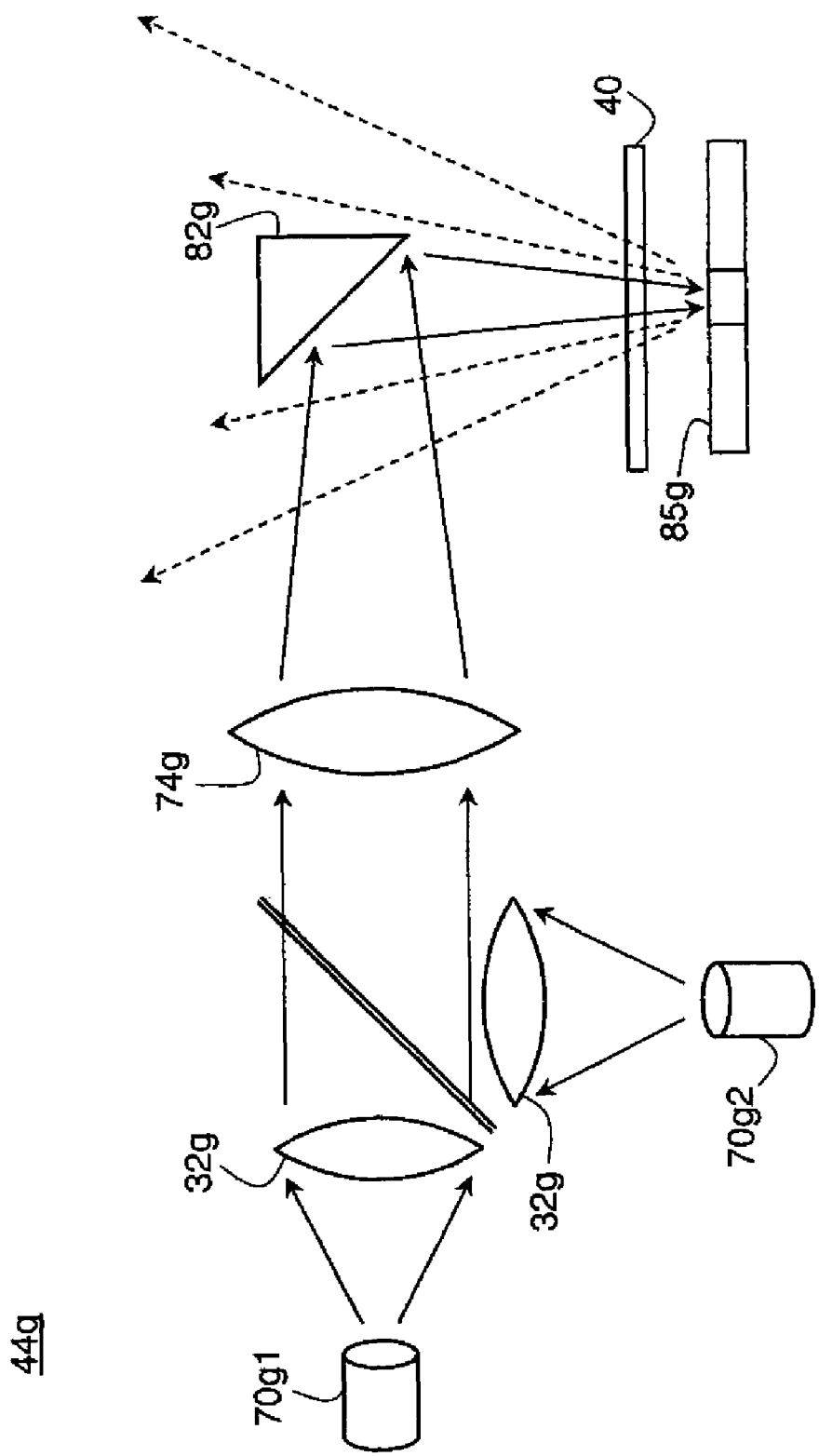
FIG. 9 is a schematic diagram showing a single color channel where both spectral separation and polarization states are used as differentiating characteristics.
Figure 10:
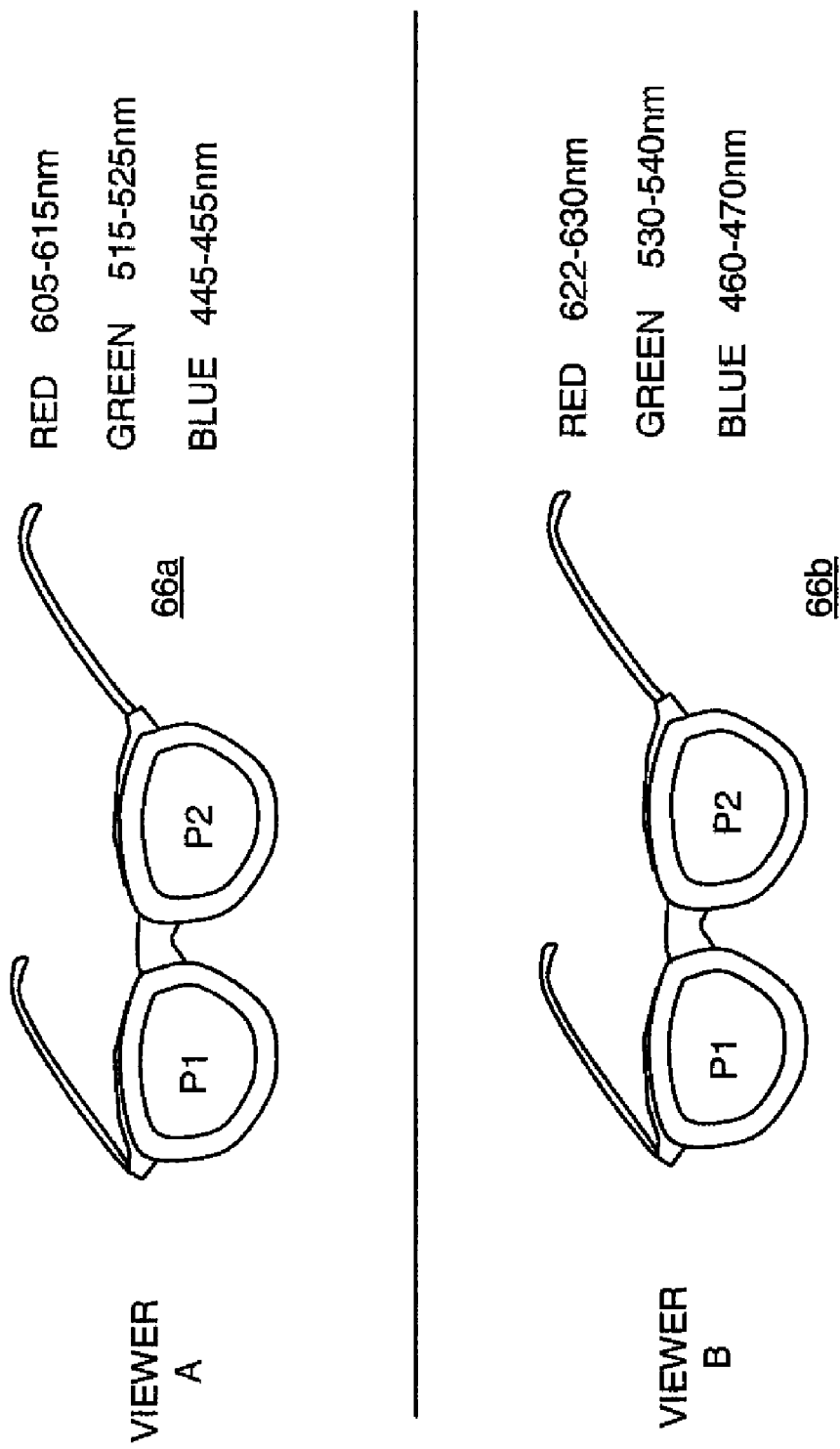
FIG. 10 is a block diagram showing decoding devices for different viewer subsets using a combination of polarization and spectral separation as differentiating characteristics.

Embodiment E5 shown in FIG. 13 uses the apparatus in FIG. 5 with the dual spectral band light source arrangement of FIG. 9. As in embodiments E1 and E2 the GEMS device may have 2160 pixels in order to display the equivalent of 1080 pixels, with the odd-numbered pixels passing polarization P1 and the even-numbered pixels passing orthogonal polarization P2. Embodiment 5 uses polarization to distinguish left-eye and right-eye stereoscopic pairs for each set of viewers while using spectral band variation for timing to alternate between eyes. During the first half of an image refresh cycle, light source S1 is on and light source S2 is off; during the second half of an image refresh cycle, light source S2 is on and S1 is off. During the first half of an image refresh cycle, the decoding devices for each of the first set of viewers (A) transmit light from light source S1 to the left eyes of the first set of viewers (A) while blocking light from light source S1 to the right eyes of the first set of viewers (A). Also, during the first half of an image refresh cycle, the decoding devices for each of the first set of viewers (A) transmit light of polarization P1 to the left eyes of the first set of viewers while blocking light from polarization P1 to the right eyes of the first set of viewers (A). During the second half of an image refresh cycle, these same decoding devices for each of the first set of viewers (A) transmit light from light source S2 to the right eyes of the first set of viewers (A) while blocking light from light source S2 to the left eyes of the first set of viewers (A). Also, during the second half of an image refresh cycle, the decoding devices for each of the first set of viewers transmit light of polarization P2 to the right eyes of the first set of viewers (A) while blocking light from polarization P2 to the left eyes of the first set of viewers (A). Similarly, during the first half of an image refresh cycle the decoding devices for each of the second set of viewers (B) transmit light from light source S1 to right eyes of the second set of viewers (B) while blocking light from light source S1 to the left eyes of the second set of viewers (B). Also, during the first half of an image refresh cycle, the decoding devices for each of the second set of viewers (B) transmit light of polarization P2 to the right eyes of the second set of viewers (B) while blocking light from polarization P2 to the left eyes of the second set of viewers (B). During the second half on an image refresh cycle, these same decoding devices for each of the second set of viewers (B) transmit light from light source S2 to the left eyes of the second set of viewers (B) while blocking light from light source S2 to the right eyes of the second set of viewers (B). Also, during the second half of an image refresh cycle, the decoding devices for each of the second set of viewers (B) transmit light of polarization P1 to the left eyes of the second set of viewers (B) while blocking light from polarization P1 to the right eyes of the second set of viewers (B).

In order to project the 2 distinct stereoscopic views using the embodiment E5, light source S1 is on and S2 is off during the first half of the image refresh cycle and the odd-numbered GEMS pixels are used to display the left-eye image for the first set of viewers (A) using polarization P1 and the even-numbered GEMS pixels used to display the right-eye image for the second set of viewers (B) using polarization P2. During the second half of the image refresh cycle, light source S2 is on and S1 is off and the odd-numbered GEMS pixels are used to display the left-eye image for the second set of viewers (B) using polarization P1 and even-numbered GEMS pixels are used to display the right-eye image for the first set of viewers (A) using polarization P2.

Embodiment E6 shown in FIG. 13 may use the apparatus shown in FIG. 5 with the dual spectral band light source arrangement of FIG. 9. As in embodiments E1 and E2 the GEMS device may have 2160 pixels in order to display the equivalent of 1080 pixels, with the odd-numbered pixels passing polarization P1 and the even-numbered pixels passing orthogonal polarization P2. In this embodiment polarization is used to distinguish between sets of viewers and Spectral band separation S1 and S2 are used to provide stereoscopic images. During the first half of an image refresh cycle light source S1 is on while S2 is off and during the second half of the image refresh cycle light source S2 is on and S1 is off. The decoding device for the first set of viewers transmits light of spectral band S1 and blocks light of spectral band S2 to the left eyes of the first set of viewers (A) while blocking light of spectral band S1 and transmits light of spectral band S2 to the right eyes of the first set of viewers (A). The decoding device for the second set of viewers (B) transmits light of spectral band S1 and blocks light of spectral band S2 to the right eyes of the second set of viewers (B) while blocking light of spectral band S1 and transmits light of spectral band S2 to the left eyes of the second set of viewers (B). During the first half of the image refresh cycle, when light source S1 is on, the odd-numbered GEMS pixels of polarization P1 are used to display the left-eye image for the first set of viewers (A) and the even-numbered GEMS pixels of polarization P2 are used to display the right-eye image of the second set of viewers (B). During the second half of the image refresh cycle, when light source S2 is on, the odd-numbered GEMS pixels of polarization P1 are used to display the left-eye image for the second set of viewers (B) and the even-numbered GEMS pixels of polarization P2 are used to display the right-eye image of the first set of viewers.

Embodiment E6 shown in FIG. 13 may also use the apparatus shown in FIG. 12 which uses two light sources that are always on and sets of bilinear GEMS devices. As in embodiments E1 and E2, the GEMS device may have 2160 pixels in order to display the equivalent of 1080 pixels, with the odd-numbered pixels passing polarization P1 and the even-numbered pixels passing orthogonal polarization P2. When the apparatus of FIG. 12 is utilized, only one half of the refresh cycle is required to display two distinct stereo images to two distinct sets A and B of viewers. The left eye stereo image of the first set of viewers (A) is presented using spectral band S1 provided by light sources 70r1, 70g1, and 70b1 with the odd-numbered GEMS pixels of polarization P1 of associated GEMS arrays 85r1, 85g1, and 85b1 of bilinear GEMS devices 120r, 120g, and 120b. The right eye stereo image of the first set of viewers (A) is presented using spectral band S2 provided by light sources 70r2, 70g2, and 70b2 with the odd-numbered GEMS pixels of polarization P1 of associated GEMS arrays 85r2, 85g, and 85b2 of bilinear GEMS devices 120r, 120g, and 120b. The right eye stereo image of the second set of viewers (B) is presented using spectral band S1 provided by light sources 70r1, 70g1, and 70b1 with the even-numbered GEMS pixels of polarization P2 of associated GEMS arrays 85r1, 85g1, and 85b1 in bilinear GEMS devices 120r, 120g, and 120b. The left eye stereo image of the second set of viewers (B) is presented using spectral band S2 provided by light sources 70r2, 70g2, and 70b2 with the even-numbered GEMS pixels of polarization P2 in associated GEMS arrays 85r2, 85g2, and 85b2 of bilinear GEMS devices 120r, 120g, and 120b. Thus, in the first half of the refresh cycle, two distinct sets of stereo images can be shown to two distinct sets A and B of viewers.

Embodiment E6 shown in FIG. 13 may also use the apparatus shown in FIG. 12 without the striped polarizers 40r, 40g, and 40b. In this case, there could be a switchable half wave plate in the projection optics to alternately switch polarizations between P1 and P2 between each successive half refresh cycle. During the first half of the refresh cycle, polarization P1 is directed to the display surface 90 and during the second half of the refresh cycle, polarization P2 goes to the projection screen. Thus, the first set of viewers (A) would see a stereoscopic image using spectral band S1 for the left-eye image and spectral band S2 for the right-eye image during the first half of the image refresh cycle and the second set of viewers (B) would see a different stereoscopic image using spectral band S2 for the left-eye image and spectral band S1 for the right-eye image during the second half of the measurement cycle.

Embodiment E7 may use the apparatus shown in FIG. 12. As in embodiments E1 and E2, the GEMS device may have 2160 pixels in order to display the equivalent of 1080 pixels, with the odd-numbered pixels modulating polarization P1 and the even-numbered pixels modulating orthogonal polarization P2. In this embodiment orthogonal polarizations P1 and P2 are used to display left-eye and right-eye stereoscopic pairs while spectral bands S1 and S2 are used to separate sets of viewers A and B. When the apparatus of FIG. 12 is utilized with embodiment E7 each half of the refresh cycle displays two distinct stereo images to two distinct sets of viewers. The stereo image of the first set of viewers (A) is presented using spectral band S1 provided by light sources 70r1, 70g1, and 70b1 with the odd-numbered GEMS pixels of polarization P1 of associated GEMS arrays 85r1, 85g1, and 85b1 of bilinear GEMS devices 120r, 120g, and 120b providing the left-eye images for the first set of viewers (A) and the even-numbered GEMS pixels of polarization P2 of associated GEMS arrays 85r1, 85g1, and 85b1 of bilinear GEMS devices 120r, 120g, and 120b providing the right-eye images for the first set of viewers (A). The stereo image of the second set of viewers (B) is presented using spectral band S2 provided by light sources 70r2, 70g2, and 70b2 with the odd-numbered GEMS pixels of polarization P1 of associated GEMS arrays 85r2, 85g2, and 85b2 of bilinear GEMS devices 120r, 120g, and 120b providing the left-eye image of the second set of viewers (B) and the even-numbered GEMS pixels of polarization P2 of associated GEMS arrays 85r2, 85g2, and 85b2 of bilinear GEMS devices 120r, 120g, and 120b providing the left-eye image of the second set of viewers (B).

It can be appreciated that the embodiment E1-E7 selection affects the corresponding encoding of image data that is provided to the GEMS device. In a number of these embodiments, odd-numbered GEMS pixels are provided for polarization P1 and even-numbered pixels for orthogonal polarization P2, to support either alternate left- and right-eye images or sets of viewers A and B. It can also be advantageous for the pixel size that is projected onto the display surface to be smaller than the eye resolution when using the alternate P1/P2 polarization approach. For example, to display a true 1920 by 1080 image, it would be necessary to use a GEMS array with 2160 pixels.

The invention has been described in detail with particular reference to certain preferred embodiments thereof, but it will be understood that variations and modifications can be effected within the scope of the invention as described above and as noted in the appended claims by a person of ordinary skill in the art without departing from the scope of the invention. For example, although GEMS devices are used in the example embodiments described herein, the use of other types of linear light modulators can be envisioned. Grating light valve (GLV) components could alternately be used instead of GEMS devices for forming left- and right-eye line images in some embodiments. The control logic circuitry that synchronizes the timing of image modulation and shutter glass operation is not shown or described in detail, but is familiar to those skilled in the electronic imaging arts. Embodiments of the present invention can also use alternative combinations of decoding devices, such as using shutter glasses with polarizers for a first set of viewers and using shutter glasses with spectral filters for a second set of viewers.

Thus, what is provided is an apparatus and method for using electromechanical grating devices for dual-view stereoscopic color projection.

PARTS LIST 10 display apparatus
20 control logic processor
24 display surface
32r spherical lens, red
32g spherical lens, green
32b spherical lens, blue
38 color combiner
40 striped polarization-modifying element
40r striped polarization-modifying element
40g striped polarization-modifying element
40b striped polarization-modifying element
41 cover glass
44r red channel
44g green channel
44b blue channel
66a decoding device
66b decoding device
70r light source, red
70r1 light source, red
70r2 light source, red
70g light source, green
70g1 light source, green
70g2 light source, green
70b light source, blue
70b1 light source, blue
70b2 light source, blue
72l lens
72r lens
74r cylindrical lens, red
74g cylindrical lens, green 74b cylindrical lens, blue
75 projection optics
77 scanning mirror
82r turning mirror, red
82g turning mirror, green
82b turning mirror, blue
85 electromechanical grating light modulator
85r electromechanical grating light modulator, red
85r1 bilinear electromechanical grating light modulators, red
85r2 bilinear electromechanical grating light modulators, red
85g electromechanical grating light modulator, green
85g1 bilinear electromechanical grating light modulators, green
85g2 bilinear electromechanical grating light modulators, green
85b electromechanical grating light modulator, blue
85b1 bilinear electromechanical grating light modulators, blue
85b2 bilinear electromechanical grating light modulators, blue
90 display surface
100 projector
108r turning mirror, red
108g turning mirror, green
108b turning mirror, blue
110 display apparatus
114 stripe
116 space
118 ribbon
120r GEMS chips
120b GEMS chips
120g GEMS chips

The invention claimed is:

1. A method for displaying a first stereoscopic image to a first viewer and a different second stereoscopic image to a second viewer in a repeated sequence having a refresh period, the repeated sequence comprising:
   a) providing the first viewer with a first decoding device having a first viewer differentiating element for receiving the first stereoscopic image and blocking the second stereoscopic image and further comprising a first left-eye differentiating element and a first right-eve differentiating element for separating left- and right-eye stereoscopic images of the first stereoscopic image, respectively;
   b) providing the second viewer with a second decoding device having a second viewer differentiating element for receiving the second stereoscopic image and blocking the first stereoscopic image and further comprising a second left-eve differentiating element and a second right-eye differentiating element for separating left- and right-eye stereoscopic images of the second stereoscopic image, respectively;
   c) displaying the first stereoscopic image to the first viewer
      (i) forming a first left-eve stereoscopic image over substantially half of the refresh period;
      (ii) forming a first right-eve stereoscopic image over substantially half of the refresh period; and
   d) displaying the second stereoscopic image to the second viewer by:
      (i) forming a second left-eye stereoscopic image over substantially half of the refresh period; and
      (ii) forming a second right-eye stereoscopic image over substantially half of the refresh period;
   wherein displaying the first stereoscopic image comprises modulating light at an electromechanical grating device;
   further comprising disposing a patterned polarization-modifying element having alternating stripes in a light modulation channel; and
   wherein the alternating stripes impose a first and a second retardation value, respectively, to form interleaved orthogonally polarized images.

2. The method of claim 1 wherein the patterned polarization-modifying element is formed on a cover plate for the electromechanical grating device.

3. The method of claim 1 wherein the orthogonally polarized images that are formed are circularly polarized.

4. The method of claim 1 wherein the first left-eye and first right-eye images for the first viewer are formed during the same half of the refresh period.

5. The method of claim 1 wherein the first left-eye and first right-eye images for the first viewer are formed during different portions of the refresh period.

* * * * *